(12) United States Patent
Berg et al.

(10) Patent No.: US 12,126,414 B2
(45) Date of Patent: Oct. 22, 2024

(54) PRE-EQUALIZATION USING BEAMFORMING FUNCTIONALITY

(71) Applicant: Telefonaktiebolaget LM Ericsson (publ), Stockholm (SE)

(72) Inventors: Miguel Berg, Sollentuna (SE); Roland Smith, Nepean (CA); Elmar Trojer, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 13 days.

(21) Appl. No.: 18/252,089

(22) PCT Filed: Nov. 17, 2021

(86) PCT No.: PCT/IB2021/060675
§ 371 (c)(1),
(2) Date: May 8, 2023

(87) PCT Pub. No.: WO2022/107024
PCT Pub. Date: May 27, 2022

(65) Prior Publication Data
US 2023/0403056 A1    Dec. 14, 2023

Related U.S. Application Data

(60) Provisional application No. 63/115,778, filed on Nov. 19, 2020.

(51) Int. Cl.
*H04B 7/06* (2006.01)
*H04B 3/06* (2006.01)

(52) U.S. Cl.
CPC ............. *H04B 7/0617* (2013.01); *H04B 3/06* (2013.01)

(58) Field of Classification Search
CPC .................................. H04B 7/0617; H04B 3/06
See application file for complete search history.

(56) References Cited

U.S. PATENT DOCUMENTS

| | | | | |
|---|---|---|---|---|
| 2010/0220800 | A1* | 9/2010 | Erell | H04L 5/0023 375/267 |
| 2011/0185394 | A1* | 7/2011 | Rakib | H04N 21/6168 725/111 |
| 2019/0238283 | A1* | 8/2019 | Liu | H04B 7/0617 |

FOREIGN PATENT DOCUMENTS

| | | |
|---|---|---|
| CN | 109 995 693 A | 7/2019 |
| WO | 2020/001259 A1 | 1/2020 |
| WO | 2020/084617 A1 | 4/2020 |

OTHER PUBLICATIONS

International Search Report and Written Opinion dated Mar. 3, 2022 issued in PCT Application No. PCT/IB2021/060675 filed Nov. 17, 2021, consisting of 14 pages.

(Continued)

*Primary Examiner* — Vineeta S Panwalker
(74) *Attorney, Agent, or Firm* — Weisberg I.P. Law, P.A.

(57) ABSTRACT

A method, network node and customer premises equipment for pre-equalization using beamforming functionality are disclosed. According to one aspect, a method in a network node includes estimating an uplink channel of a hybrid fiber cable network using references signals received from consumer premises equipment, determining a downlink channel using an inverse of the uplink channel estimate, mapping a downlink signal to a plurality of layer-specific signals, and applying beamforming weights to the layer-specific signals to produce layer-specific downlink signals, and summing the layer-specific downlink signals to produce a frequency-compensated downlink signal for transmission over the hybrid fiber cable network.

24 Claims, 19 Drawing Sheets

(56) References Cited

OTHER PUBLICATIONS

3GPP TS 38.104 V15.4.0 (Dec. 2018) 3rd Generation Partnership Project; Technical Specification Group Radio Access Network; NR; Base Station (BS) radio transmission and reception (Release 15), consisting of 208 pages.

ETSI TS 137 213 V15.1.0 (Oct. 2018) LTE; Physical layer procedures for shared spectrum channel access (3GPP TS 37.213 version 15.1.0 Release 15), consisting of 22 pages.

* cited by examiner

PRE-EQUALIZATION USING BEAMFORMING FUNCTIONALITY

CROSS-REFERENCE TO RELATED APPLICATIONS

This application is a Submission Under 35 U.S.C. § 371 for U.S. National Stage Patent Application of International Application No.: PCT/IB2021/060675, filed Nov. 17, 2021 entitled "PRE-EQUALIZATION USING BEAMFORMING FUNCTIONALITY," which claims priority to U.S. Provisional Application No. 63/115,778, filed Nov. 19, 2020, entitled "PRE-EQUALIZATION USING ANALOGUE BEAMFORMING FUNCTIONALITY," the entireties of both of which are incorporated herein by reference.

FIELD

The present disclosure relates to wireless communications, and in particular, to pre-equalization using beam forming functionality.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

The hybrid fiber cable (HFC) network in the United States of America delivers NTSC (National Television Systems Committee) analog television signals and digital services to Cable MODEMs over the available plant bandwidth up to 1002 MHz for Data Over Cable Service Interface Specification (DOCSIS) 3.0, 1218 MHz with DOCSIS 3.1, and 1.8 GHz proposed with DOCSIS 4.0 using extended spectrum DOCSIS. In the downstream direction, the cable system is assumed to have a pass band with a lower edge of either 54 MHz or 108 MHz, and an upper edge that is implementation-dependent but is typically in the range of 300 to 1002 MHz, for DOCSIS 3.0. Other countries use Phase Alternating Line (PAL) and other standards. While the network has evolved towards increasingly digital services, it has also allowed for mixed analog and digital services as defined in Society of Cable Telecommunications Engineers (SCTE)-40 Digital Cable Network Interface Standard.

None of these cable services currently include 3GPP cellular signals for wireless access. Cable service providers have traditionally used Wi-Fi as the technology for unlicensed residential wireless access. Small office/premises office (SOHO) or residential DOCSIS Cable MODEMs often include an integrated Wi-Fi radio, or alternately, a local area network (LAN) Ethernet port on the Cable modulator/demodulator (MODEM) is often connected to an external Wi-Fi Access Point for wireless connectivity. While Wi-Fi has evolved greatly in speed, its scope has been limited to premises or office stand-a-lone networks due to lack of networking standards and vendor interworking issues.

3GPP cellular networks are engineered for interworking, achieved by a limited ecosystem of equipment manufacturers dominated by a small number of system vendors. Interworking is achieved in large part through a constantly evolving common software and hardware platform for cellular access radio products, for example based on 4G/LTE (eNodeB) and 5G/NR (gNodeB). These are complex programmable platforms which cannot be reduced in scale and to the same cost points as Wi-Fi chipsets while maintaining the programmability to update functionality to a constantly evolving 3GPP standard. In short, current 3GPP access technology hardware platforms are not designed to be deployed in home/premises applications. An attempt was made to introduce 'Pico' and 'femto' 3GPP base stations for premises and office deployments without success due to prohibitive software development and interworking costs. DAS or Distributed Antenna Systems were introduced with good success into enterprise and public venues such as metros airports, etc.

The only viable solution for Cable Network operators to deliver 3GPP cellular signals for in-premises applications is to deploy radio base stations, e.g., eNB or gNB, on the Cable Plant and distribute signals as digital or analog carriers which can be reconstituted and rebroadcast in the premises. The solution requires that each radio base station provide cellular service to a local community, in the same way that the HFC cable network provides services to the local community.

The use of 3GPP backhaul signals over cable a wired connection between a mobile termination device and a radio base station to deliver access signals over the air has been considered. Some references suggest the use of Integrated Access and Backhaul (IAB) over an HFC cable network to provide digital backhaul to terminal devices in the premises. These teachings address the connectivity issue, but not the practicality of achieving a complex programmable platform at the same cost points as Wi-Fi chipsets.

A digital solution has been considered that leverages the DOCSIS network to deliver a digital data stream of Ethernet packets, or similar digital communications between a radio base station such as an eNB (an LTE base station) or gNB (an NR base station) deployed in the HFC cable network and a digital repeater in the premises used to reconstitute and rebroadcast digitally codes carriers. The digital transport of carriers avoids plant impairments which would affect an analog transport solution.

The remaining viable solution is the deployment of radio base stations such as eNB or gNB radio base stations on the Cable Plant and distribute signals as analog carriers to be reconstituted and rebroadcast in the premises. While this solution appears simple, plant characteristics and impairments make it an engineering challenge.

Metallic coaxial cables are known to have strongly frequency-dependent attenuation. HFC networks compensate for this by employing coax signal amplifiers with statically configured slope compensation. Signal taps for the access links may also have some inherent slope compensation requiring a truck-roll if change is needed. However, static compensation of frequency dependent attenuation is at best an approximation, as shown in the FIG. 1 where losses are misaligned from expectations by approximately 5% or several dB.

For wideband carriers, static pre-equalization may not give optimal performance since one part of the carrier may support lower-order modulation than another part. In wireless channels, fading and mobility usually ensures that all parts of the carrier have the same average performance, but this is not the case for an HFC coax channel.

Additional non-linearities exist in coaxial networks which are not solved using fixed/static equalizers. These problems are unique to cabled amplified networks and are characterized by non-linear frequency responses caused by cascaded or non-cascaded gain variations and cable insertion losses, reflections, resonances, signal non-linear mixing, interference, and signal filtering.

Some examples to highlight these issues are as follows:

Signal tilt is caused by the characteristics of cable loss verses frequency and is a function of many passive cable related parameters such as diameter, dielectric constant and conductor resistance, but is also caused by line amplifiers which launch signals with a positive tilt that increases with frequency so that the signal arrives with flat tilt at the input to the next amplifier. A graph of example coaxial cable plant signal tilt is shown in FIG. 2.

Resonances are impedance mismatches from the characteristic 75Ω transmission line resulting in frequency dependent notches, peaks, and suck-outs. Micro-reflections within the coaxial cable plant can have long delay spreads especially in main feeder lines and appear as low frequency resonances caused by signal beating. While common in dielectric media systems, resonances are not seen in 3GPP networks where transmission is over the air (dielectric=1.00). A graph of example coaxial cable plant resonances is shown in FIG. 3.

Micro-reflections are caused by impedance mismatches. SCTE-40 specifies micro-reflections in coaxial cable networks up to −10 dBc at ≤0.5 μs causing several dBs of signal level variations.

Roll-off or frequency dependent insertion loss in filters and taps is most visible above 1200 MHz, which is above the operational bands of DOCSIS 2.0 and 3.0 networks. With the increased frequency range of DOCSIS 3.1 and forthcoming DOCSIS 4.0 networks, new active equipment will be required to operate in the presence of these impairments, as country wide coaxial cable plant upgrades will take many years, and in many cases, may never occur.

As an example, insertion losses of a power passing tap often has many dBs of gain variations and this does not include losses in the coaxial cable run between the power passing tap and the ingress point at the premises. A graph of an example signal level versus frequency for a 4-way tap is shown in FIG. 4.

HFC impairments impact the coaxial cable plant linearity, and consequently, the ability to carry analog cellular carriers such as eNB or gNB carriers. While impairments can be traced to root causes, such as impedance mismatches, damaged cables, insertion loss variations in couplers and power inserters, diplexers, band pass filters, poor or missing cable terminations in the coaxial cable plant tap ports or premises TV receivers, signal combiners, etc., many impairments change with temperature and/or humidity and are pervasive. In general, only the most service-affecting faults are repaired by HFC network technicians.

These impairments ensure that if a wireless 5G/NR analog repeater is used in the premises, this repeater may not fulfil 3GPP base station requirements on transmitter characteristics (e.g., high error vector magnitude (EVM) due to spectral ripple in the carrier).

Coaxial cable plant impairments have been a problem since the first cable networks started in the late 1940's with Community Access Television (CATC). CATV networks carried broadcast channels 2-13 directly to the premises television (TV) as analog signals, initially amplified from a recovered over the air signal. The introduction of fiber optics and hybrid-fiber coaxial networks greatly increased the number of channels delivered to communities. Coaxial cable plant impairments such as micro-reflections would often cause ghosting of the TV images.

In the late 1990's, the introduction of Cable MODEMs to enable Internet access, evolved the networks to be a mix of analog and digital TV channels. This evolution continues to this day, with most channels carried digitally to the premises and to the set top boxes.

To this day, cable operators have evolved their networks towards increasing digital integration and connectivity, employing signal processing and error corrections to mitigate coaxial cable plant impairments. While this strategy has served the industry well in its quest to deliver digital Internet connectivity, on demand video services, and enabling mobility connectivity using Wi-Fi, it has acted as a barrier for 3GPP eNB and gNB wireless connectivity.

Existing solutions do not attempt to equalize the impairments. Rather they design the network elements of the DOCSIS equipment to accept the full range of coaxial cable plant impairments. Cable MODEMs are specified to meet a set of coaxial cable plant impairments defined in SCTE-40. Impairments include worse case carrier levels of −12 dBmV to +15 dBmV; maximum amplitude variation across the 6-MHz channel of 6 dB peak-to-peak; AM hum modulation of 3%; group delay variation of 0.37 μs/MHz; Carrier-to-noise-plus-interference ratio; composite triple beat (CTB) and composite second order (CSO) levels; Chroma/Luma Delay; Phase Noise specifications; etc. Hum is an amplitude modulation of the carrier by a signal whose frequency is usually a harmonic of the power line frequency.

Existing solutions provide capabilities to statically monitor HFC network elements and coaxial cable plant, using, for example, spectrum analyzer technology built into the cable modem termination system (CMTS), to detect and measure impairments affecting transmitted carriers. With this detailed monitoring capability, technicians can be sent to fix the most adverse impairments as they arise. These solutions do not dynamically adjust to correct for impairments, such as temperature variations in coaxial cable plant performance.

Existing solutions employ fixed network elements to correct for known coaxial cable plant impairments such as cable loss, frequency dependent attenuation and power passing taps rated for DOCSIS 3.1 frequencies, etc. These solutions do not apply dynamic adjustments.

None of the existing solutions correct for the multitude of coaxial cable plant impairments from small mismatches in impedance, reflections, amplitude variations across carriers, etc. Therefore, existing solutions so not enable analog 3GPP carriers to be transported across the HFC network without distortion.

Micro-reflections add significant delayed signal components with time delayed components ranging from −10 dBc to −30 dBc with skews up to 4.5 μs as defined in SCTE-40. While these impairments are considered typical of cable systems, they exceed bounds set for 3GPP 5G systems and can result in excessive inter-symbol-interference impacting downlink (DL) and uplink (UL) signal to interference plus noise ratio (SINR) and modulation rates.

Finally, existing systems operate within cable plant operating conditions, limiting customer premises equipment (CPE) signals to the range of −15 dBmV to +15 dBmV and limiting CTB/CSO levels to −53 dBc. Existing systems have not increased ratio of energy per bit to spectral noise (Eb/No) from 27 dB/33 dB for 64/256 quadrature amplitude modulation (QAM) operation to higher levels necessary for 5G multiple input multiple output (MIMO) operation.

SUMMARY

Some embodiments advantageously provide methods, network nodes and customer premises equipment for pre-equalization using beamforming functionality.

Some embodiments include a closed loop control system which employs frequency-selective beamforming in the network node, e.g., gNB, to dynamically pre-equalize the HFC coax channel for each user (either by applying different "beam weights" in the frequency domain for different groups of resource blocks, or by using, e.g., digital time-domain beamforming with finite impulse response (FIR) filters).

Normally, beamforming in 3GPP systems use constant power spectral density (PSD) in the downlink. In contrast, some embodiments disclosed herein modify beamforming (BF) so that the DL PSD is configured as the inverse of the UL cable frequency response based on UL signals such as sounding reference signals (SRS), and/or WD (sub-band) measurement reports. 3GPP employs WD UL signals to assess SINR to enable UL frequency selective scheduling. There is no attempt to adjust UL PSD based on detected over the air channel impairments such as fading.

In some embodiments, the wireless device (WD) function is located at the remote CPE to receive a signal which has not been compromised by dispersive over the air channel impairments. NR CPE operate in time division duplex (TDD) mode which, through reciprocity, helps ensure that UL and DL channel frequency responses are equivalent.

This feature operates to minimize non-linear frequency dependent effects such as described in this disclosure by employing DL frequency selective beamforming using pre-equalization independently applied to each transmitted MIMO antenna branch. A control loop facilitates closed loop stability of transmitted 3GPP NR signals, by compensating for HFC frequency dependent impairments, in addition to the plurality of channel filters necessary to convert between frequency and spatial multiplexed streams.

In short, some embodiments include a complete end-to-end solution in which streams or layers are frequency stacked in a coax cable, with the ability of the network node, e.g., gNB, to apply different power spectral adjustments for different layers. This is not the case for 4G/5G beamforming today.

Some embodiments use one or more of the NR standardized reference signals with constant PSD as a mechanism to monitor and correct for non-linear frequency dependent effects unique to coaxial cable plant networks. In correcting for these impairments, some embodiments provide a flat transmission spectrum to dynamically meet 3GPP specifications for required transmit power levels. Some embodiments may use any one of a number of reference signals, including reference signals used in 5G systems such as one of the demodulation reference signals (DM-RS) (DL and UL), tracking reference signals (TRS), sounding reference signal (SRS), channel state information reference signal (CSI-RS), or phase tracking reference signals (PTRS) to accurately characterize the coaxial cable plant channel, so as to apply beamforming corrections.

Some embodiments may also be employed to apply a pre-coded gain adjustment to the UL signals, to further improve UL reception by mitigating coaxial cable impairments. This additional capability may be achieved using out-of-band messaging of UL determined weights or may be possible with CPE frequency selective processing of stream specific reference signals such as those listed above.

If dynamic range requirements are too high, this scheme can be combined with known static analog pre-equalization where the analog slope compensation compensates for the average slope, while some embodiments using the analog slope compensation are configured to fine-tune the slope individually for each WD.

Channel coherence time is expected to be very long on the coaxial cable, so measurement frequency can be very low. In some embodiments, anomalies in the hybrid fiber cable network may be detected by analyzing the "beam weights" and how they evolve over time. In some embodiments, the beam weights may indicate specific spectral portions of branches of the HFC network providing CPE connectivity, which might not be correctable or are approaching the limits of equalization correction.

A long duration channel coherence time greatly improves the scalability of some embodiments. Whereas 4G reference signals are typically sent with a fast periodicity of 5 ms or 20 ms limiting the resource set, this disclosure teaches use of much longer periodicities of seconds, vastly increasing the resource set, while not adversely impacting data throughput. For example, a 100 MHz NR channel may be configured for 5 ms TDD slots, each supporting four reference signal symbols. A full band signal may be scheduled with slot-periodicities of: 1, 2, 4, 5, 8, 10, 16, 20, 32, 40, 64, 80, 160, 320, 640, 1280, and 2560, the latter of which would support up to 4×2560=10240 CPEs, each being updated every 12.8 seconds. Alternately, aperiodic (ApSRS) may be employed to reduce signaling overhead while increasing the potential number of connected CPE's. ApSRS may also be used to address necessary channel characterization rates for infrequent cases where coaxial cable plant conditions change rapidly due to cable motion experienced during windstorms. This was a common problem with optical plant carried in overhead bundles where channel dispersion changed with the sway of the cables.

According to one aspect, network node includes processing circuitry configured to: determine an uplink channel estimate of the hybrid fiber cable network based at least in part on references signals received from consumer premises equipment, CPE, in the hybrid fiber cable network; determine a downlink channel estimate based at least in part on an inverse of the uplink channel estimate; and map a first downlink signal to a plurality of layer-specific signals, each layer-specific signal being associated with a layer of a plurality of layers, a frequency and a set of beamforming weights, each set of beamforming weights being based at least in part on the downlink channel estimate. The processing circuitry is further configured to, for each layer-specific signal, apply beamforming weights to symbols of the layer-specific signal to produce a layer-specific downlink signal and sum the layer-specific downlink signals to produce a frequency-compensated downlink signal for transmission on a hybrid fiber cable of the hybrid fiber cable network.

In some embodiments, the downlink channel estimate is further based on power constraints. In some embodiments, the reference signals comprise a reference signal for each layer of the plurality of layers. In some embodiments, a reference signal includes at least one of a demodulation reference signal, DMRS, a sounding reference signal, SRS, a tracking reference signal, TRS, channel state information reference signal, CSI-RS, and a phase tracking reference signal, PTRS. In some embodiments, symbols of a layer-specific signal are orthogonal frequency division multiplexed, OFDM. In some embodiments, the processing circuitry is further configured to apply intermodulation product cancellation in each layer of the plurality of layers. In some embodiments, the processing circuitry is further configured to apply an inverse fast Fourier transform, IFFT, to the beamforming-weighted symbols in each layer of the plurality of layers. In some embodiments, the frequency-compensated downlink signal is compensated to counteract an effect of the frequency response of the hybrid fiber cable network.

According to another aspect, a method in a network node for equalizing uplink and downlink impairments over a cable to the CPE is provided. The process includes determining an uplink channel estimate of the hybrid fiber cable network based at least in part on references signals received from consumer premises equipment, CPE, in the hybrid fiber cable network. The process also includes determining a downlink channel estimated based at least in part on an inverse of the uplink channel estimate. The process also includes mapping a first downlink signal to a plurality of layer-specific signals, each layer-specific signal being associated with a layer of a plurality of layers, a frequency and a set of beamforming weights, each set of beamforming weights being based at least in part on the downlink channel estimate. The process further includes for each layer-specific signal, applying beamforming weights to symbols of the layer-specific signal to produce a layer-specific downlink signal. The process also includes summing the layer-specific downlink signals to produce a frequency-compensated downlink signal for transmission on a hybrid fiber cable of the hybrid fiber cable network.

In some embodiments, the downlink channel estimate is further based on power constraints. In some embodiments, the reference signals comprise a reference signal for each layer of the plurality of layers. In some embodiments, a reference signal includes at least one of a demodulation reference signal, DMRS, a sounding reference signal, SRS, a tracking reference signal, TRS, channel state information reference signal, CSI-RS, and a phase tracking reference signal, PTRS. In some embodiments, symbols of a layer-specific signal are orthogonal frequency division multiplexed, OFDM. In some embodiments, the process also includes applying intermodulation product cancellation in each layer of the plurality of layers. In some embodiments, the process also includes applying an inverse fast Fourier transform, IFFT, to the beamforming-weighted symbols in each layer of the plurality of layers. In some embodiments, the frequency-compensated downlink signal is compensated to counteract an effect of the frequency response of the hybrid fiber cable network. In some embodiments, the reference signals are orthogonal. In some embodiments, the method also includes the reference signals are received with a slot periodicity that is lower than a slot-periodicity of slots carrying the symbols. In some embodiments, the reference signals have a slot periodicity that is scalable based on a number CPEs in the hybrid fiber cable network.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
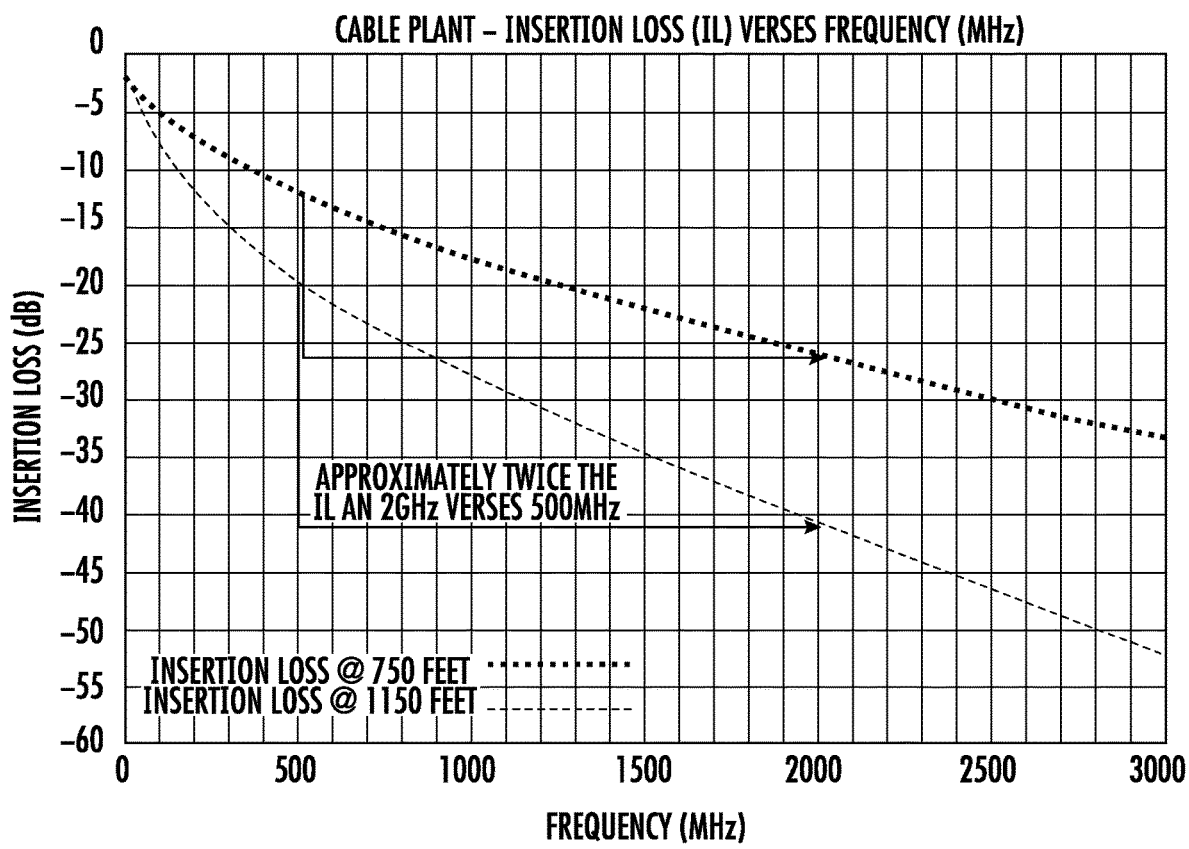
FIG. 1 is a graph of coaxial cable plant insertion loss versus frequency.
Figure 2:
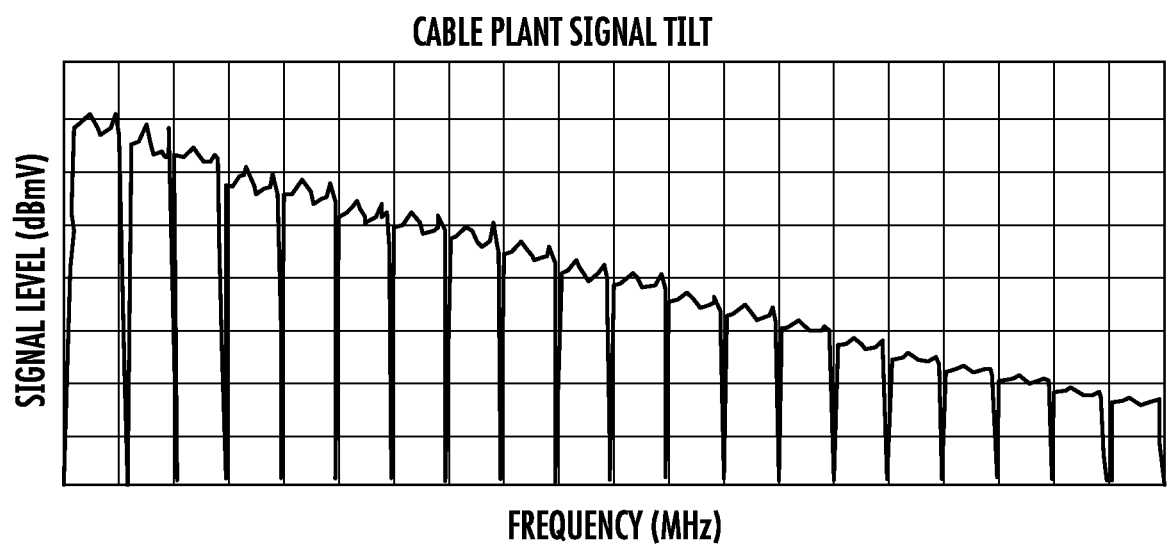
FIG. 2 is a graph of coaxial cable plant signal tilt versus frequency.
Figure 3:
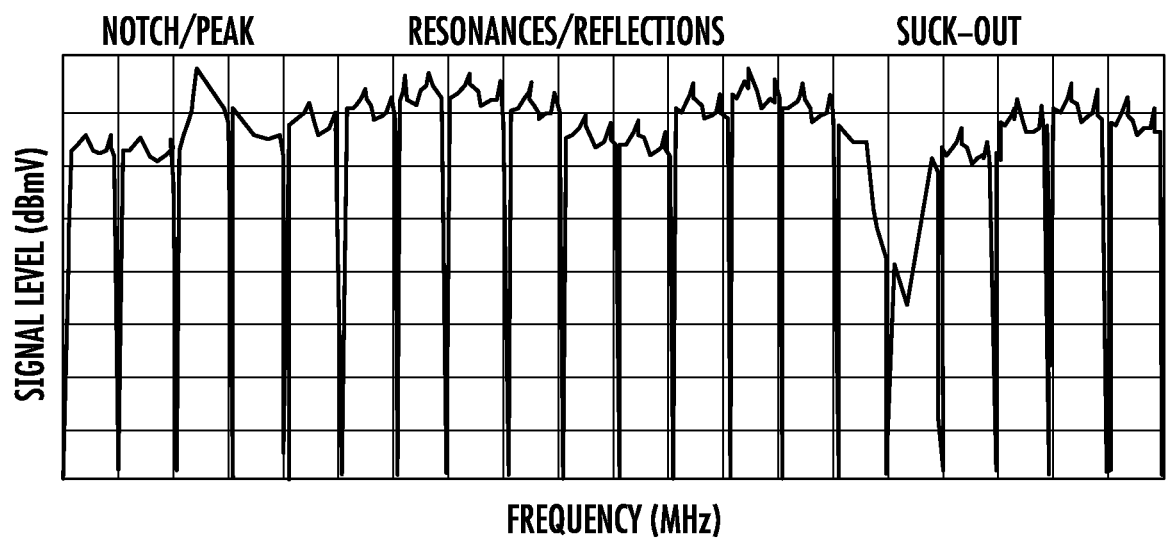
FIG. 3 is a graph of coaxial cable plant resonances versus frequency.
Figure 4:
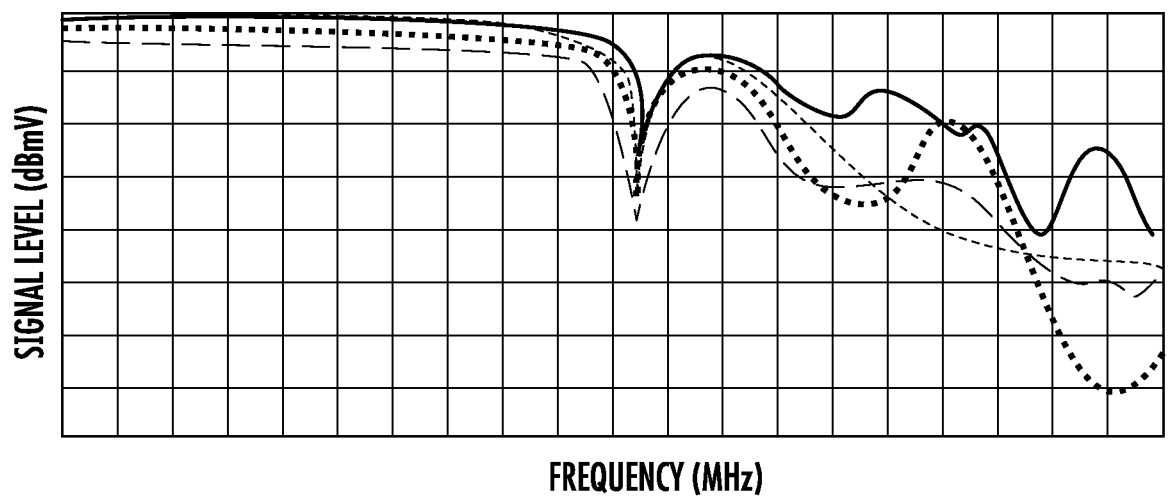
FIG. 4 is a graph of insertion loss variation.

Before describing in detail example embodiments, it is noted that the embodiments reside primarily in combinations of apparatus components and processing steps related to pre-equalization using beamforming functionality. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio and/or cable network which may further comprise any of base station (BS), radio base station, base transceiver station (BTS), lower layer split distributed unit (LLS-DU), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide pre-equalization using beamforming functionality. According to some aspects, a CPE is effectively a radio frequency (RF) repeater and may provide connectivity to several local devices. In some embodiments, the number of CPE may be limited to about 500 to 2000 premises, enabling a reduction in reference signals to one per slot. Some embodiments employ a 4G/5G wireless device (WD) for UL reference signal generation, CPE monitoring, control, and 3GPP data extraction.

Figure 5:
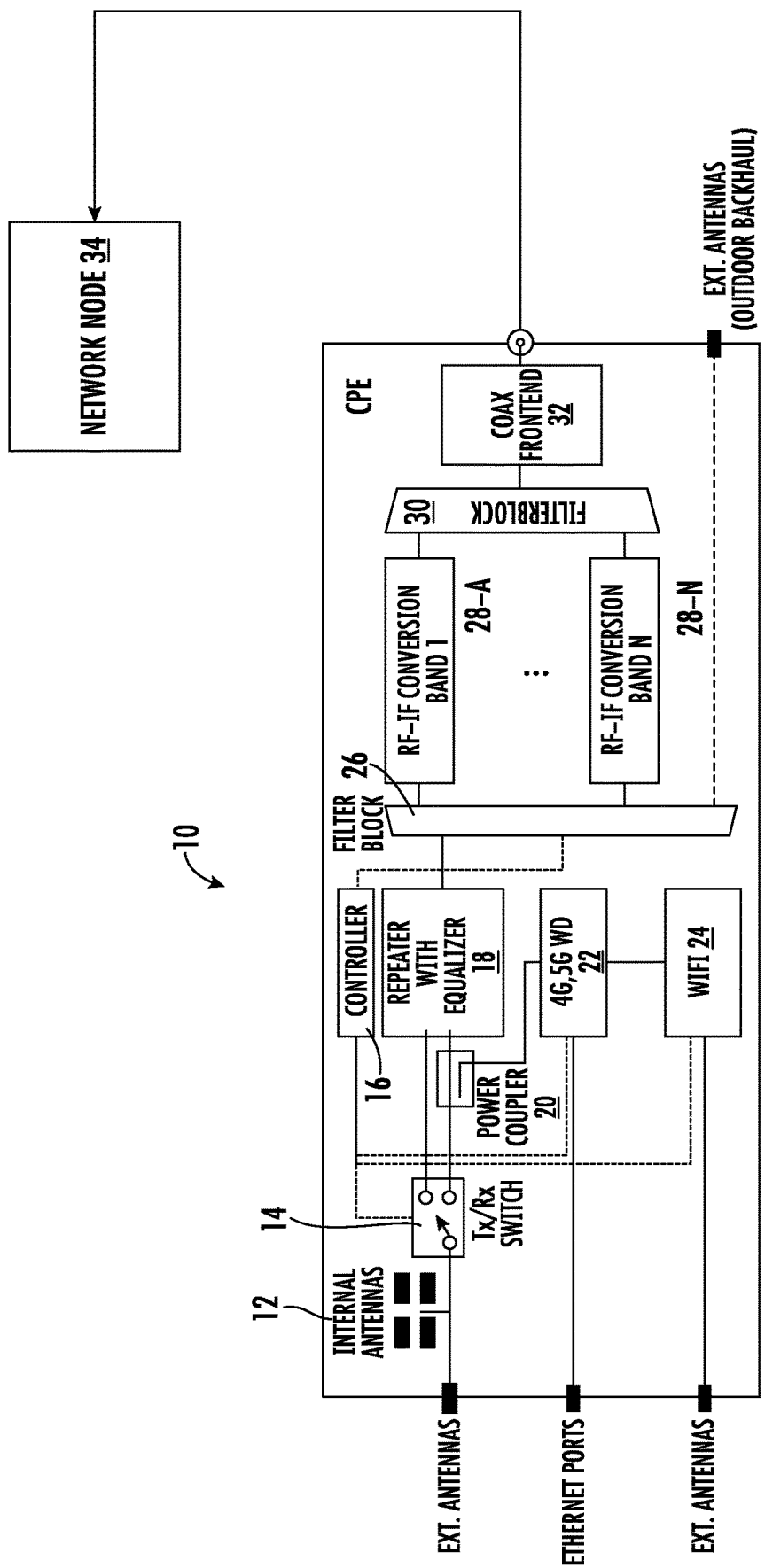
FIG. 5 is block diagram of a customer premises equipment (CPE)

Returning now to the drawing figures, where like reference designators refer to like elements, there is shown in FIG. 5 a block diagram of an example CPE 10 that includes internal antennas 12 and external antennas which may transmit or receive RF signals according to a setting of a transmit/receive (Tx/Rx) switch 14 that is under the control of the controller 16. The Tx/Rx switch 14 couples signal power to a repeater 18 with equalizer. A purpose of the repeater 18 with equalizer is to equalize the wireless channel between the CPE 10 and WDs in wireless communication with the CPE 10. In some embodiments, the equalizer function of the repeater 18 is omitted. In other words, the equalizer function is optional. For example, beamforming in the network node can be used to pre-equalize the downlink signal so that it has nearly flat PSD at the repeater (compensating for the coaxial cable plant). This reduces CPE complexity and is a use case for the pre-equalization to avoid violating radio conformance requirements. The uplink might still benefit from an equalizer, but for some applications, an amplifier in the repeater may be sufficient.

Some of the signal power is coupled via a power coupler 20 to a reference signal generator 22 configured to generate a cellular reference signal, for example for 4G and 5G WDs. A Wi-Fi transceiver 24 is coupled to external antennas to communicate with a WD. The signal from the repeater 18 with equalizer is input to a filter block 26 which filters the received signal in each of a plurality of bands. The CPE 10 includes an RF-intermediate frequency (IF) converter, such as RF-IF converters 28-A through 28-N, for each of N bands for which a signal is received from the filter block 26. The outputs of the RF-IF converters 28-A though 28-N, referred to collectively as RF/IF converters 28, are filtered in another filter block 30. The output of the filter block 30 is coupled to a coax front end 32.

Figure 6:
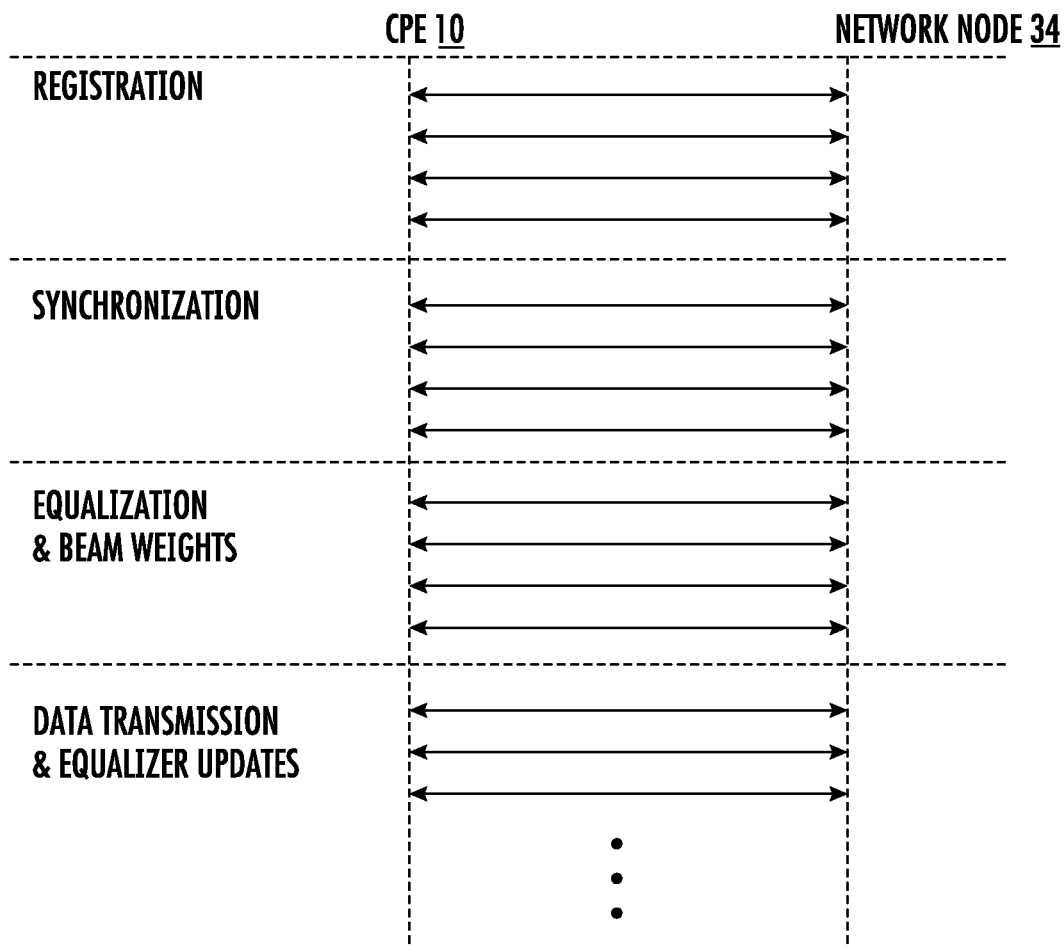
FIG. 6 is diagram of signals exchanged between a CPE and a gNB.
Figure 7:
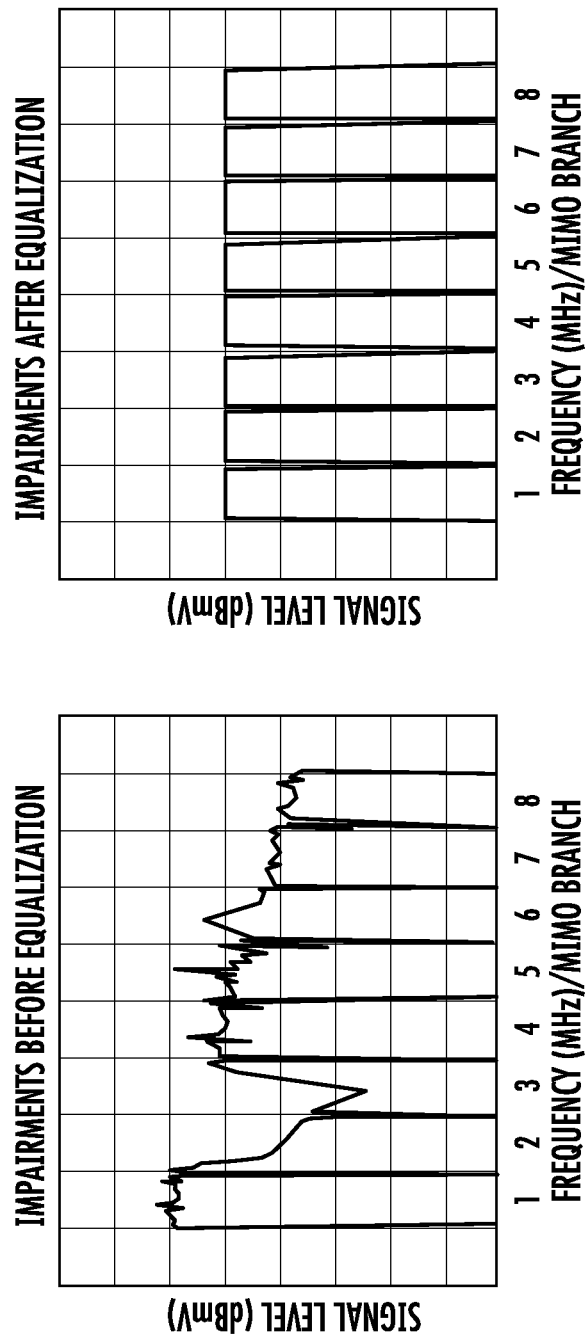
FIG. 7 is side by side comparison of impairments before and after equalization.

An aspect of this system is the baseband monitoring and feedback control loop between the network node 34 and CPE 10 which works to exchange reference symbols between CPE 10 and the network node 34, and equalize downlink and uplink impairments and apply power corrections using functionality intended for beamforming. FIG. 6 illustrates an example communication between the CPE 10 and a network node 34 for registration, synchronization, equalization and beam weights as well as data transmission and equalizer updates. FIG. 7 is an example of side by side comparison of impairments of a signal before equalization and impairments after equalization.

In some embodiments, one or more of the following steps may be performed or occur:
1. network node 34 receives CPE controller registration;
2. network node 34 synchronizes and aligns CPE UL timing network node frame;
3. network node 34 assigns CPE 10 to a specific sector;
4. network node 34 configures CPE 10 for UL/DL reference symbol transmission;
5. network node 34 processes reference symbols to estimate UL&DL impairments before equalization; and
6. network node 34 configures sector beam weights to equalize UL&DL impairments.

These steps assume that the coaxial fiber has beam correspondence, where the network node 34 is able to derive the DL transmit (Tx) beam from the CPE 10 transmitted UL Tx signal. The coaxial cable network is operated in a TDD mode, with common cable routes, passive filters, and splitters, power passing taps. These components may operate on the same frequencies for UL & DL MIMO streams. Therefore, it may be expected that impairments will be reciprocal. The expectation of beam correspondence may enable DL beam management and impairment equalization to be used for UL impairment equalization.

In the unlikely case that TDD reciprocity is not achieved, message flows requiring the CPE 10 to process DL reference signals may be utilized with feedback provided to the network node 34 for beam weighting equalization. This information is largely static in nature and can be exchanged over a low bandwidth control channel. In some embodiments, frequency division duplex (FDD) may be employed on the coaxial cable plant, instead of TDD, which would require more stringent filtering, but less stringent timing synchronization. This may have the advantage if there are amplifiers between the network node 34 and CPEs 10.

Some embodiments have multiple advantages over the current static approach. These advantages may include one or more of the following:
  Some embodiments achieve much more accurate pre-equalization than the static approach used in HFC today. Conventional networks employ tilt adjustment, requiring service personnel to visit the site, make measurements, and select and install the appropriate passive adjustment.
  Some embodiments enable frequency selective adjustments across the analog carrier to compensate for the peaks and dips of the resonances, reflections and notches which occur across the full spectrum of the coaxial cable plant which is subjected to impedance mismatches.
  Some embodiments enable dynamic adjustment to compensate for environmental temporal variations in HFC impairments and active gain (and loss) variations in HFC line amplifiers and couplers.
  Some embodiments compensate for filter roll-off "Q" issues and excessive gain variations across passbands resulting from installed components over decades of hybrid fiber cable network construction.
  Some embodiments dynamically adjust for AM hum modulation from power line crosstalk.
  Some embodiments dynamically self-configure without technician intervention.
  Some embodiments support an unlimited number of wireless in-premises repeaters, uniquely and dynamically improving the carrier quality performance to mitigate signal quality issues for each device.
  Some embodiments provide per customer data for analysis and troubleshooting.

One advantage of some embodiments is the reuse of part of existing functionality in the conventional network node which lowers complexity compared with placing a complete digital equalizer in the signal chain. This advantage redefines sector-selectable sets of parameters of phases and weights representing beam coverage areas to larger sets of the same parameters representing dynamic impairment adjustments per wireless premises repeater.

Figure 8:
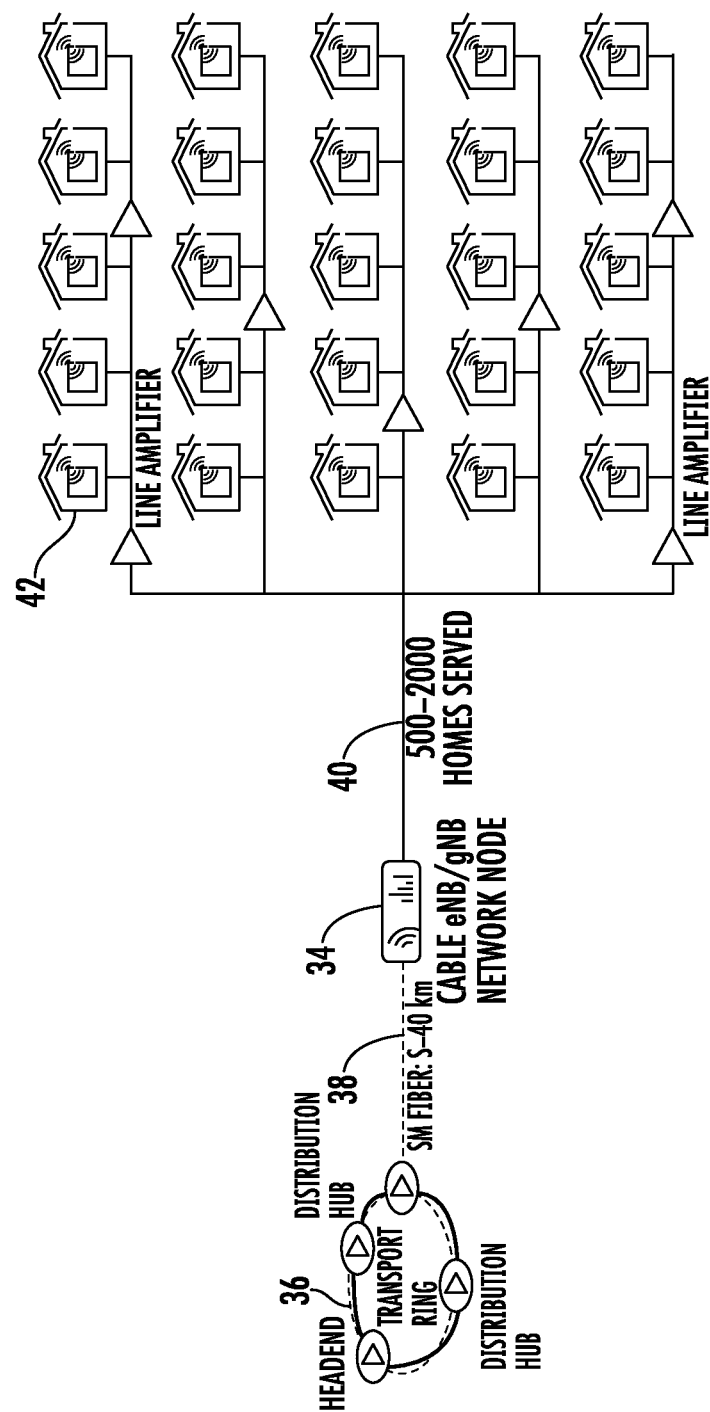
FIG. 8 is a diagram of a cable network including a network node.

FIG. 8 shows an example architecture in which a network node 34, e.g., base station (eNB or gNB) is configured to receive signals from a distribution hub 36 over a fiber optic cable 38 and distribute the signals over an HFC 40 to a plurality of premises 42.

A beamforming network node 34 would normally divide downlink power equally between antenna MIMO layers and use the same power for all active secondary cell groups (SCGs). In some embodiments, the network node 34 transmits MIMO streams or layers on independent frequency bands of the coaxial cable plant by frequency division multiplexing. In some embodiments, the network node 34 employs separate beam weightings per MIMO stream. This may be achieved through monitoring of UL or DL reference signals which are received on these independent plant frequencies.

The reference signals may be identical across each layer, employing the same pattern on all coaxial cable frequencies, or may be unique, such as the DM-RS with different orthogonal weights applied to each of the spatial streams.

Some embodiments employ independent reference signals per UL coaxial cable MIMO mapped stream since these signals enable additional functionality to be delivered, specifically, to cancel coaxial cable "intermodulation products" commonly known as CTB or "Composite Triple Beat." CTB may be defined as a third order distortion caused by mixing three carriers (A+B−C) that falls on the fundamental of a carrier. CSO or "Composite Second Order" may be defined as the sum effect of all second order distortion products.

Independent orthogonal reference signals may be used to detect non-linear mixing as cross-correlations of UL and DL transmissions. Non-linear products in CTB and CSO signals are anticipated as the cable networks signal levels increase to maximize Eb/No ("energy per bit" divided by "noise per bit") to achieve the highest possible data rates. While current cable systems constrain coaxial signals levels to limit CTB and CSO to be "not worse than −53 dBc referenced to in band carrier levels for analog channels" according to SCTE-40, a 10 dB increase in DL or UL transmitted power would increase CSO interference by 20 dB to −33 dBc. Regardless of how the network node 34 may optimize DL and UL signal levels over the coaxial cable network, the network node 34 may introduce intermodulation cancellation technology in cable networks to enable increased transmission power while mitigating non-linear CTB/CTS effects, thereby delivering higher data rates in the future. Some embodiments, apply correlation techniques of orthogonal reference signals.

Some embodiments apply beam weighting to independent MIMO layers transmitted in a coaxial cable network relying on a feedback loop between customer premises equipment (CPE) 10 and the network node 34. In some embodiments, beam weights are applied to equalize received power at the customer premises so that analog MIMO streams can be frequency shifted, and spatially retransmitted without demodulation and remodulation as is the case for a digital repeater.

In principle, beam weights can be chosen inversely proportional to the measured path gain for the specific layer and subcarrier group (e.g., based on SRS and/or DM-RS or any other orthogonal signal). Similar to the coaxial cable network, where dBmV signal levels are maintained through careful end-to-end gain controls designed to deliver both an "upstream" 0 dBmV level to the cable modem termination system (CMTS) and the same 0 dBmV level to the CPE 10; typically a cable mode (CM), the network node 34 and CPE 10 can target defined input and output signals levels. This can ensure that beam weightings do not cause a defined maximum transmit power level through the cable network to be exceeded.

Note that cable network line extender amplifiers apply predistortion tilt to transmitted signals which have a normal operating range of −15 dBmV to +15 dBmV per 6 MHz, but are targeted to operate as discussed above at 0 dBmV/6 MHz. While this does not appear to be a significant power level, these amplifiers can operate at 55 dBmV signals levels. This tilt is designed to compensate for the outside plant insertion loss between amplifiers, so that signals which leave a first line extender amplifier tilted with higher power at greater frequencies arrive at the next amplifier without a tilt and at a nominal 0 dBmV/6 MHz power level.

With network node 34 signals operating in the extended range of the coaxial cable operating bandwidth, it is expected that predistortion tilt will be greater over a larger bandwidth. At such high-power levels, careful power control in the beam forming weights may help to avoid possible ill effects.

Another difference between the network node 34 disclosed herein and a conventional network node is how layers are mapped to antennas. In the network node 34 disclosed herein, frequencies can be multiplexed to a single "antenna," which is the interface to the coaxial cable plant.

Figure 9:
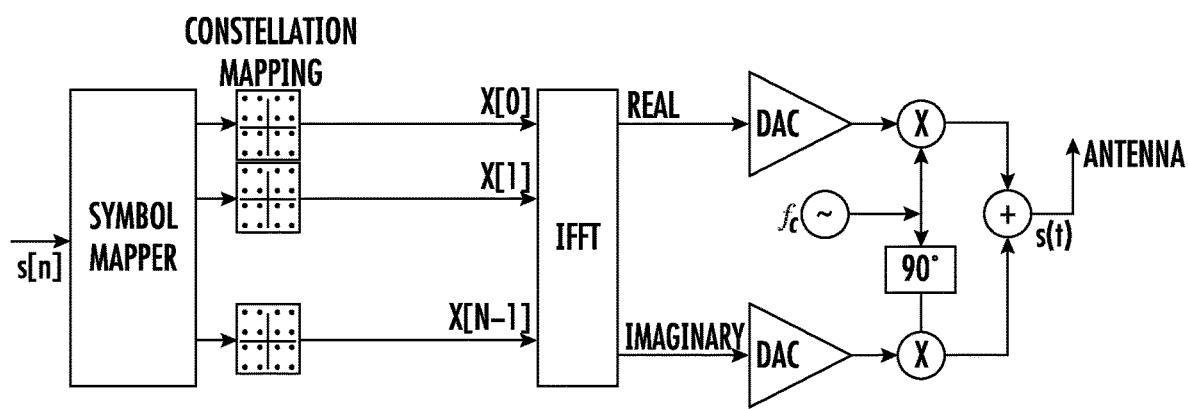
FIG. 9 is a block diagram of radio interface.
Figure 10:
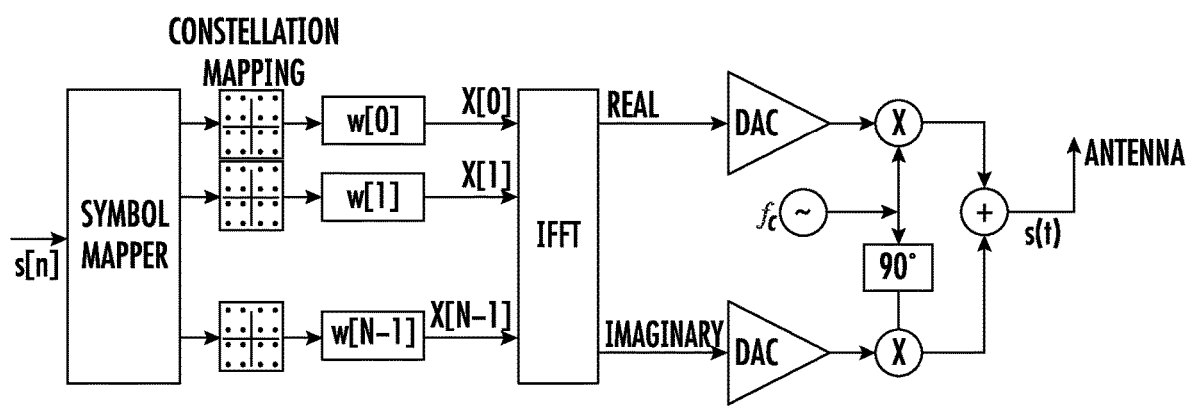
FIG. 10 is a block diagram of a radio interface that applies frequency-selective beamforming weights.

At least two embodiments are possible. Some embodiments employ a standard OFDM modulation block and convert a serial data stream into a parallel data stream for constellation mapping onto symbols with constant normalized weights. An inverse fast Fourier transform (IFFT) converts the symbols into real and imaginary components which are mixed to generate an OFDM signal. FIGS. 9 and 10 disclose a transmitter and processing circuitry in a radio of a 5G base station. FIG. 9 shows a conventional system that maps OFDM signals onto an antenna for transmission. Beam weighting, which introduces a weight w[i] to each of the OFDM mapped symbols, is shown in the example of FIG. 10.

Figure 11:
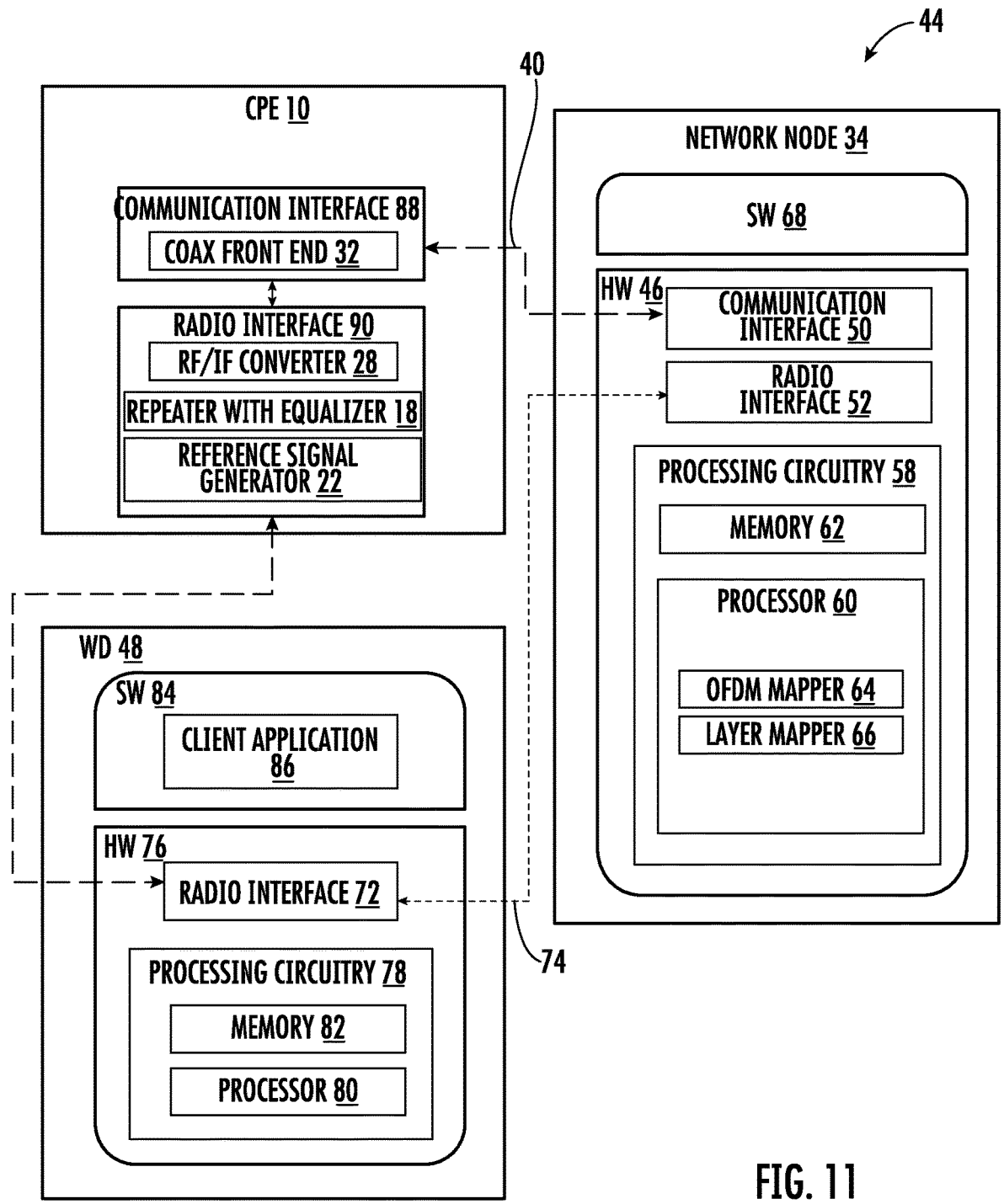
FIG. 11 is a block diagram of a cable communication system that includes a network node, CPE and WD.
Figure 12:
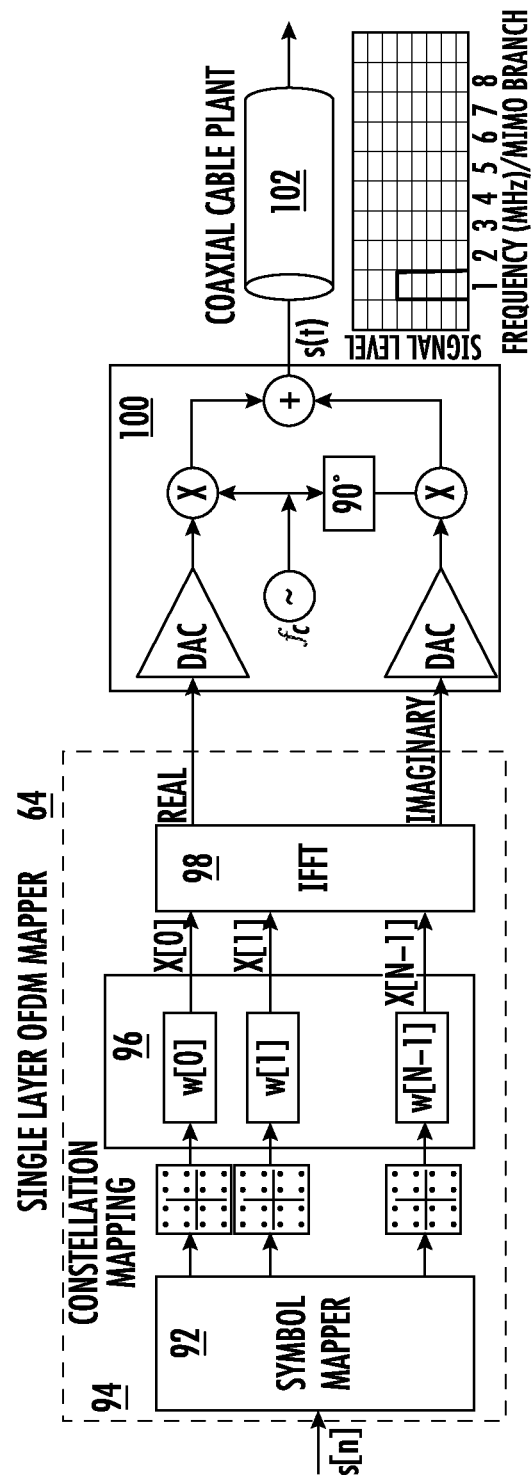
FIG. 12 is a block diagram of a single layer orthogonal frequency division multiplex (OFDM) mapper.

Some embodiments extend the concept of beam weighting by mapping multiple OFDM layers onto a single coaxial cable system applying a unique set of layer specific beam weights to each signal. FIG. 11 is a block diagram of a system 11 configured to apply beam weighting in a network node 34 to signals directed to and/or from customer premises equipment (CPE) 10. FIG. 11 shows network node 34 provided in a communication system 44 and including hardware 46 enabling network node 34 to communicate with the WD 48 and the CPE 10. The hardware 46 may include a communication interface 50 for setting up and maintaining a wired or wireless connection with an interface of a different communication device of the communication system 44, as well as a radio interface 52 for setting up and maintaining at least a wireless connection with the WD 48 located in a coverage area served by the network node 34. The radio interface 52 may be formed as or may include, for example, one or more RF transmitters, one or more RF receivers, and/or one or more RF transceivers. The communication interface 50 may be configured to facilitate a connection over a HFC 40 to the CPE 10.

In the embodiment shown, the hardware 46 of the network node 34 further includes processing circuitry 58. The processing circuitry 58 may include a processor and a memory 62. In particular, in addition to or instead of a processor, such as a central processing unit, and memory, the processing circuitry 58 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 60 may be configured to access (e.g., write to and/or read from) the memory 62, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 34 further has software 68 stored internally in, for example, memory 62, or stored in external memory (e.g., database, storage array, network storage device, etc.) accessible by the network node 34 via an external connection. The software 68 may be executable by the processing circuitry 58. The processing circuitry 58 may be configured to control any of the methods and/or processes described herein and/or to cause such methods, and/or processes to be performed, e.g., by network node 34. Processor 60 corresponds to one or more processors 60 for performing network node 34 functions described herein. The memory 62 is configured to store data, programmatic software code and/or other information described herein. In some embodiments, the software 68 may include instructions that, when executed by the processor 60 and/or processing circuitry 58, causes the processor 60 and/or processing circuitry 58 to perform the processes described herein with respect to network node 34. For example, processing circuitry 58 of the network node 34 may include an OFDM mapper 64 configured to map signals to the communication interface 50. The processing circuitry 58 of the network node 34 may further be configured to include a layer mapper 66 configured to map MIMO layers on independent frequency bands.

The communication system 44 further includes the WD 48 already referred to. The WD 48 may have hardware 70 that may include a radio interface 72 configured to set up and maintain a wireless connection 74 with the network node 34 serving a coverage area in which the WD 48 is currently located. The radio interface 72 may be formed as or may include, for example, one or more RF transmitters, one or more RF receivers, and/or one or more RF transceivers.

The hardware 76 of the WD 48 further includes processing circuitry 78. The processing circuitry 78 may include a processor 80 and memory 82. In particular, in addition to or instead of a processor, such as a central processing unit, and memory, the processing circuitry 78 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 80 may be configured to access (e.g., write to and/or read from) memory 82, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 48 may further comprise software 84, which is stored in, for example, memory 82 at the WD 48, or stored in external memory (e.g., database, storage array, network storage device, etc.) accessible by the WD 48. The software 84 may be executable by the processing circuitry 78. The software 84 may include a client application 86. The client application 86 may be operable to provide a service to a human or non-human user via the WD 48.

The processing circuitry 78 may be configured to control any of the methods and/or processes described herein and/or to cause such methods, and/or processes to be performed, e.g., by WD 48. The processor 80 corresponds to one or more processors 80 for performing WD functions described herein. The WD 48 includes memory 82 that is configured to store data, programmatic software code and/or other information described herein. In some embodiments, the software 84 and/or the client application 86 may include instructions that, when executed by the processor 80 and/or processing circuitry 78, causes the processor 80 and/or processing circuitry 78 to perform the processes described herein with respect to WD 48.

The wireless connection 74 between the WD 48 and the network node 34 is in accordance with the teachings of the embodiments described throughout this disclosure. The teachings of some of these embodiments may improve the data rate, latency, and/or power consumption and thereby provide benefits such as reduced user waiting time, relaxed restriction on file size, better responsiveness, extended battery lifetime, etc.

FIG. 11 also includes the CPE 10. The CPE 10 may include a communication interface 88 and a radio interface 90. The communication interface 88 is configured to include the coax front end 32. The communication interface 88 is configured to receive signals from the communication interface 50 of the network node 34 and transmit signals to the communication interface 50 of the network node 34 over the HFC 40. The CPE 10 includes a radio interface 90 the enables RF communication with the WD 48. The radio interface 90 is coupled to the communication interface 88 to convey signals to the communication interface 88 and convey signals from the communication interface 88 to the radio interface 90. The radio interface 90 is configured to include the RF/IF converter 28, the repeater 18 with equalizer and the reference signal generator 22. The components of the CPE 10 may be implemented integrated circuitry.

Although FIG. 11 shows various "units" such as the OFDM mapper 64 and the layer mapper 66 as being within a respective processor, it is contemplated that these units may be implemented such that a portion of the unit is stored in a corresponding memory within the processing circuitry. In other words, the units may be implemented in hardware or in a combination of hardware and software within the processing circuitry. Also, although network node 34, CPE 10 and WD 48 are shown as directly connected, it is understood that such depiction is merely for convenience and to aid understanding. It is contemplated that there may be intermediary components facilitating communications among network node 34, CPE 10 and WD 48.

FIG. 11 is an example diagram of a single layer OFDM mapper 64 that maps a data signal s[n] using OFDM into a single layer frequency signal for transmission to the coaxial cable plant 102, as opposed to sending the signal at RF onto an antenna. The OFDM mapper 64 includes a symbol mapper 92 which maps the received data signal s[n] into parallel streams of symbols that are input to a constellation mapping stage 94. The constellation mapping stage 96 map the symbols to a plurality of constellation points. The outputs of the constellation mapping stage 96 are weighted by the beam weights w[n] in a beamformer 96 which may be implemented by the processing circuitry 58. The weights w[n] are adapted to produce weighted data signals X[n] which are input to an inverse fast Fourier transformer (IFFT) 98. The IFFT 98 performs an inverse fast Fourier transform on the data signals X[n] to produce real and imaginary signals that are heterodyned by the front end 100. The output of the front end 100 is a signal s(t) which is a sum of the I and Q signals produced by the heterodyne process of the front end 100. The signal s(t) is applied to the coaxial cable plant 102. The chart of signal level versus frequency illustrates that only a single frequency channel is transmitted by the OFDM mapper 64 and the front end 100.

Figure 13:
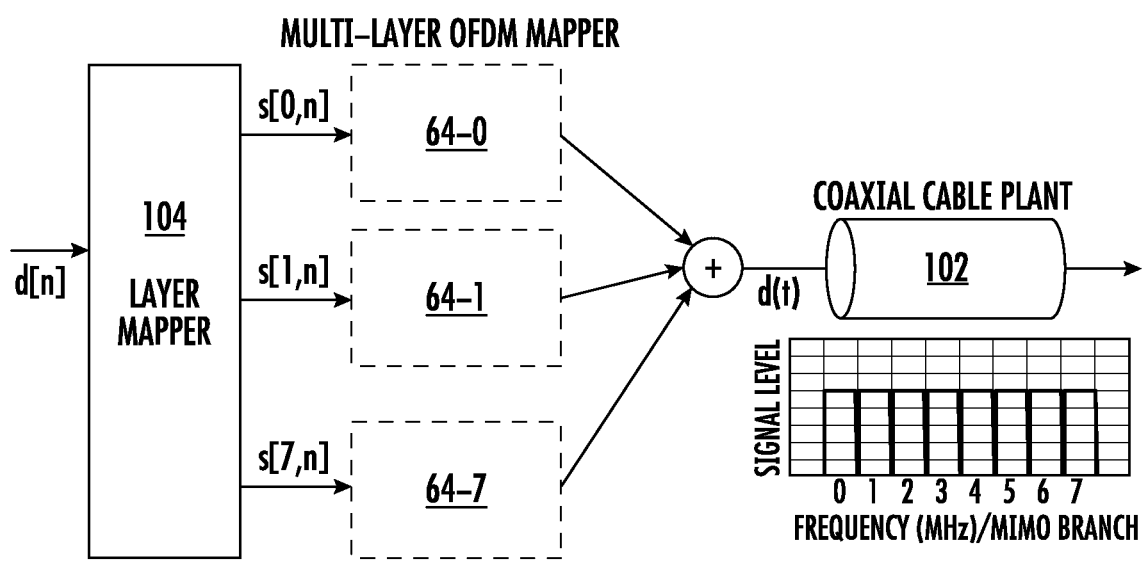
FIG. 13 is a block diagram of a multiple layer OFDM mapper.

Further, multiple layers may be introduced over the same coaxial cable. FIG. 13 shows an example of mapping 8 MIMO layers onto separate frequencies shown as being adjacent for simplicity. More or less than 8 MIMO layers may be implemented.

Figure 14:
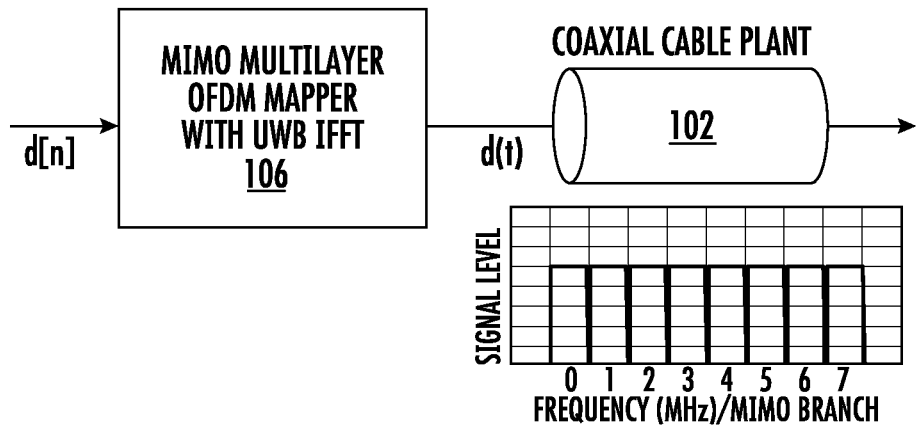
FIG. 14 is a block diagram of a MIMO multilayer OFDM mapper with ultrawide band (UWB) mapper.

In FIG. 13, each layer corresponds to a different frequency. A signal is d[n] is received by a layer mapper 104 that maps the signal d[n] to signals s[0,n], s[1,n] . . . s[7,n]. At each layer m of the eight layers, the signal s[m, n] is mapped by a single layer mapper 64-$m$, m=0, 1 . . . 7, to a plurality of signals $s_m(t)$, each signal $s_m(t)$ being on a different layer. These signals are added to produce the output signal d(t). The chart of signal level versus frequency in FIG. 13 shows all eight channels being applied to the coaxial cable plant 102. Each single layer OFDM mapper 64-0, 64-1 . . . 64-7, has its own symbol mapper 92, beam forming weights w[n] 96 and IFFT 98. The layers are subsequently combined as time domain signals d(t) to be transmitted over the coaxial cable plant 102, also referred to herein as a HFC network. FIG. 14 shows that these functions may be combined with an ultra-wide band (UWB) IFFT in a MIMO mapping unit 106 to generate the time domain signal to be transmitted over the coaxial cable plant 102.

Figure 15:
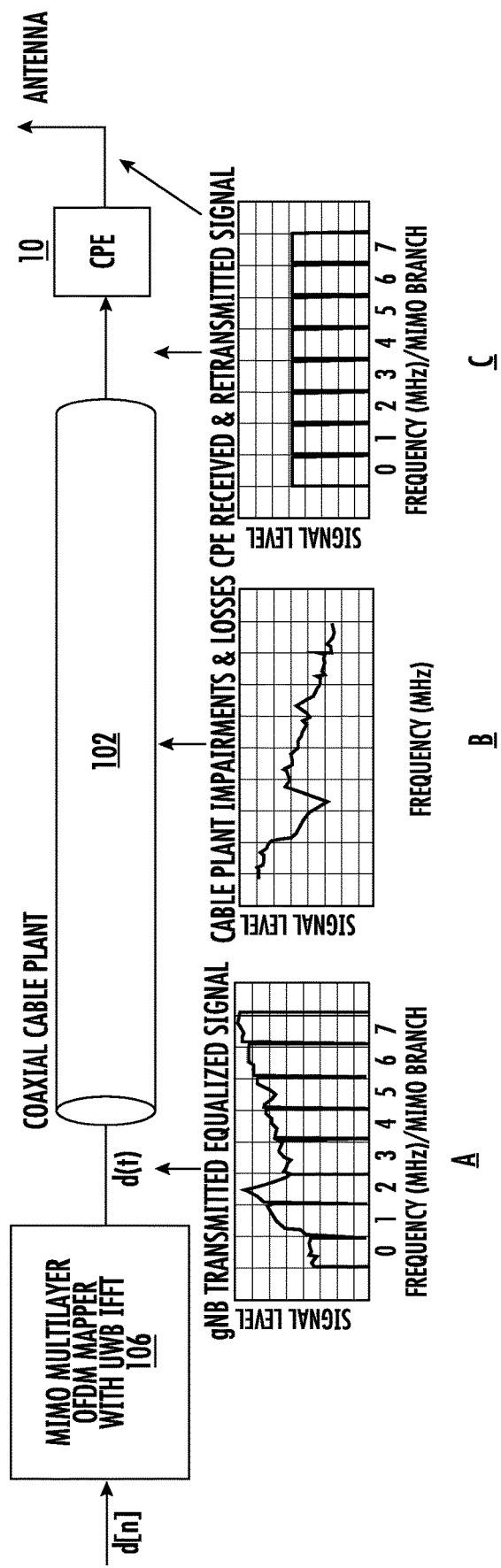
FIG. 15 is a diagram of the OFDM mapper of FIG. 13 coupled to a coaxial cable plant.

Individual beam weights may then be independently applied to each of the OFDM layers to account for coaxial cable frequency dependent impediments as shown in the diagram of FIG. 15. In FIG. 15, graph A is a frequency representation of the signal d(t) that is the sum of a plurality of beamformed signals output by the MIMO mapping unit 106. Graph B is the frequency response of the coaxial cable plant 102 which the equalization provided by the MIMO mapping unit 106 is designed to counteract. The resultant signal received by the CPE 10 is shown in graph C, having a flat frequency profile.

Thus, some embodiments include a network node 34 that includes processing circuitry 58 configured to: determine an uplink channel estimate of the hybrid fiber cable network based at least in part on references signals received from consumer premises equipment, CPE, in the hybrid fiber cable network; determine a downlink channel estimate based at least in part on an inverse of the uplink channel estimate; and map a first downlink signal to a plurality of layer-specific signals, each layer-specific signal being associated with a layer of a plurality of layers, a frequency and a set of beamforming weights, each set of beamforming weights being based at least in part on the downlink channel estimate. The processing circuitry 58 is further configured to, for each layer-specific signal, apply beamforming weights to symbols of the layer-specific signal to produce a layer-specific downlink signal and sum the layer-specific downlink signals to produce a frequency-compensated downlink signal for transmission on a hybrid fiber cable of the hybrid fiber cable network.

In some embodiments, the downlink channel estimate is further based on power constraints. In some embodiments, the reference signals comprise a reference signal for each layer of the plurality of layers. In some embodiments, a reference signal includes at least one of a demodulation reference signal, DMRS, a sounding reference signal, SRS, a tracking reference signal, TRS, channel state information reference signal, CSI-RS, and a phase tracking reference signal, PTRS. In some embodiments, symbols of a layer-specific signal are orthogonal frequency division multiplexed, OFDM. In some embodiments, the processing circuitry is further configured to apply intermodulation product cancellation in each layer of the plurality of layers. In some embodiments, the processing circuitry 58 is further configured to apply an inverse fast Fourier transform, IFFT, to the beamforming-weighted symbols in each layer of the plurality of layers. In some embodiments, the frequency-compensated downlink signal is compensated to counteract an effect of the frequency response of the hybrid fiber cable network.

To summarize, some embodiments address one or more of the following:
- 3GPP does not define unique weightings for each layer;
- 3GPP does not define frequency dependent tilt, which is unique to coaxial cable plant systems but must be addressed in the beamforming weights;
- 3GPP does not define beamforming weights which are based on TDD feedback.
- 3GPP does not define layer specific feedback for beamforming;
- 3GPP does not define CTB/CSO intermodulation detection using orthogonal codes on each layer. Nor does 3GPP define layer specific CTB/CSO (intermodulation product) cancellation techniques; and
- 3GPP does not describe the use of beamforming to enable coherent combination of frequency separate MIMO layers in the CPE 10 equipment, maintaining SINR with no loss of fidelity.

Some embodiments disclosed herein may employ 3GPP or proprietary enhancements for optical regional access network (ORAN) as to the number of supported beams in a 5G/NR beamforming network node 34.

Figure 16:
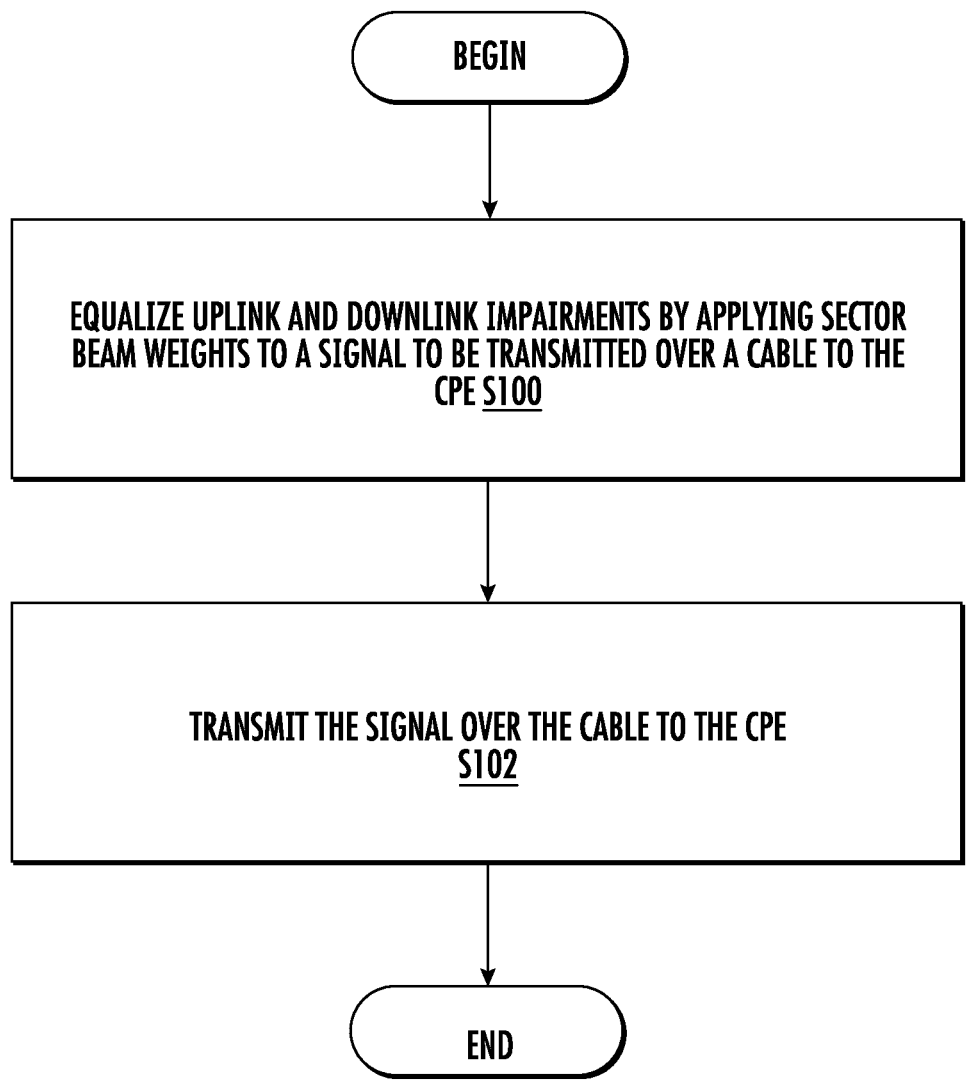
FIG. 16 is a flowchart of an example process in a network node for pre-equalization using beamforming functionality.

FIG. 16 is a flowchart of an example process in a network node 34 for pre-equalization using beamforming functionality. One or more blocks described herein may be performed by one or more elements of network node 34 such as by one or more of processing circuitry 58 (including the OFDM mapper 64 and/or the layer mapper 66), processor 60, radio interface 52 and/or communication interface 50. Network node 34 such as via processing circuitry 58 and/or processor 60 and/or radio interface 52 and/or communication interface 50 is configured to equalize uplink and downlink impairments by applying sector beam weights to a signal to be transmitted over a cable to the CPE (Block S100). The process also includes transmitting the signal over the cable to the CPE (Block S102).

Figure 17:
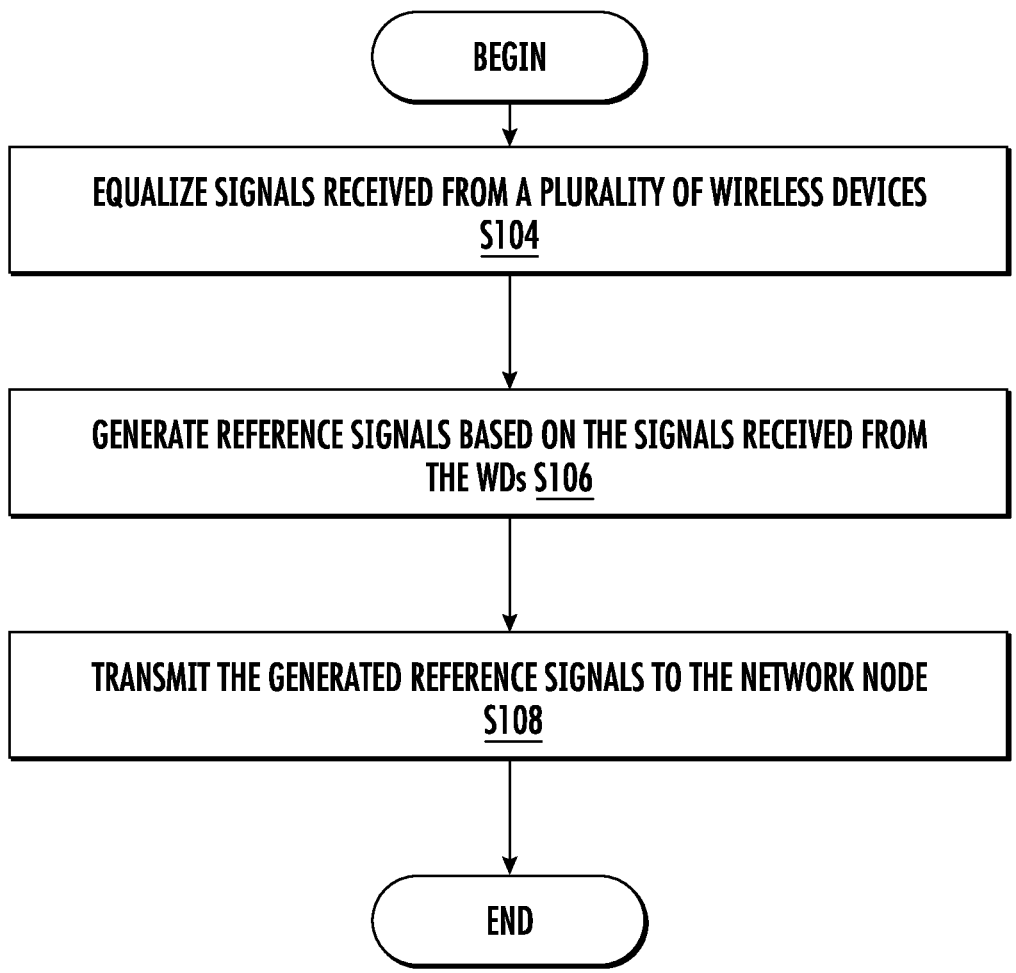
FIG. 17 is a flowchart of an example process in a wireless device for pre-equalization using beamforming functionality.

FIG. 17 is a flowchart of an example process in a CPE 10 according to some embodiments of the present disclosure. One or more blocks described herein may be performed by one or more elements of CPE 10 such as by one or more of the radio interface 90 (including the RF/IF converter 28, repeater 18 with equalizer and the reference signal generator 22), and/or communication interface 88. The CPE 10, such as via the radio interface 90 and/or communication interface 88, is configured to equalize signals received from a plurality of wireless devices (WDs) (Block S104). The process also includes generating reference signals based on the signals received from the WDs (Block S106). The process also includes transmitting the generated reference signals to the network node 34 (Block S108).

Figure 18:
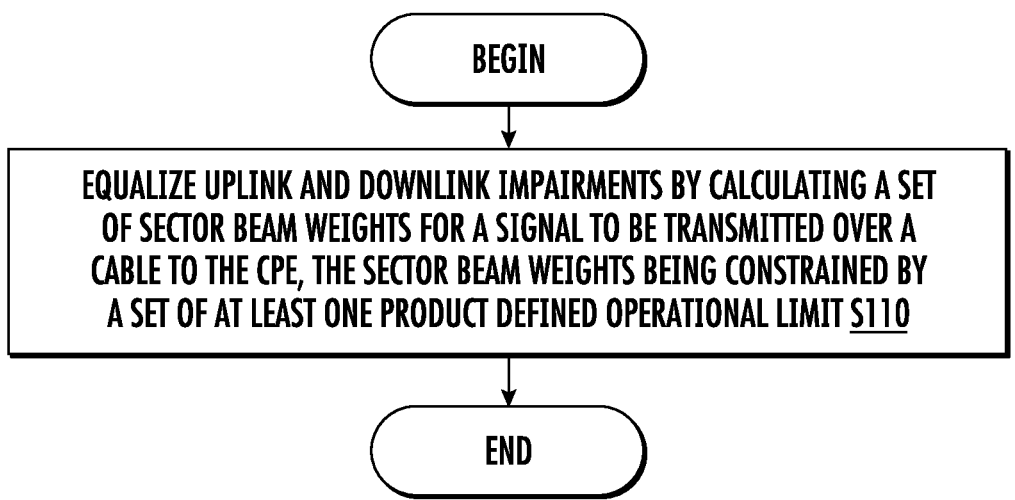
FIG. 18 is a flowchart of an example process in a network node for equalizing impairments in a coaxial cable plant.

FIG. 18 is a flowchart of an example process in a network node 34 for equalizing uplink and downlink impairments over a cable to the CPE. The process may be performed by processing circuitry 58 and/or processor 60 and/or radio interface 52 and/or communication interface 50. The process includes equalizing uplink and downlink impairments by calculating a set of sector beam weights for a signal to be transmitted over a cable to the CPE, the sector beam weights being constrained by a set of at least one product defined operational limit (Block S110).

Figure 19:
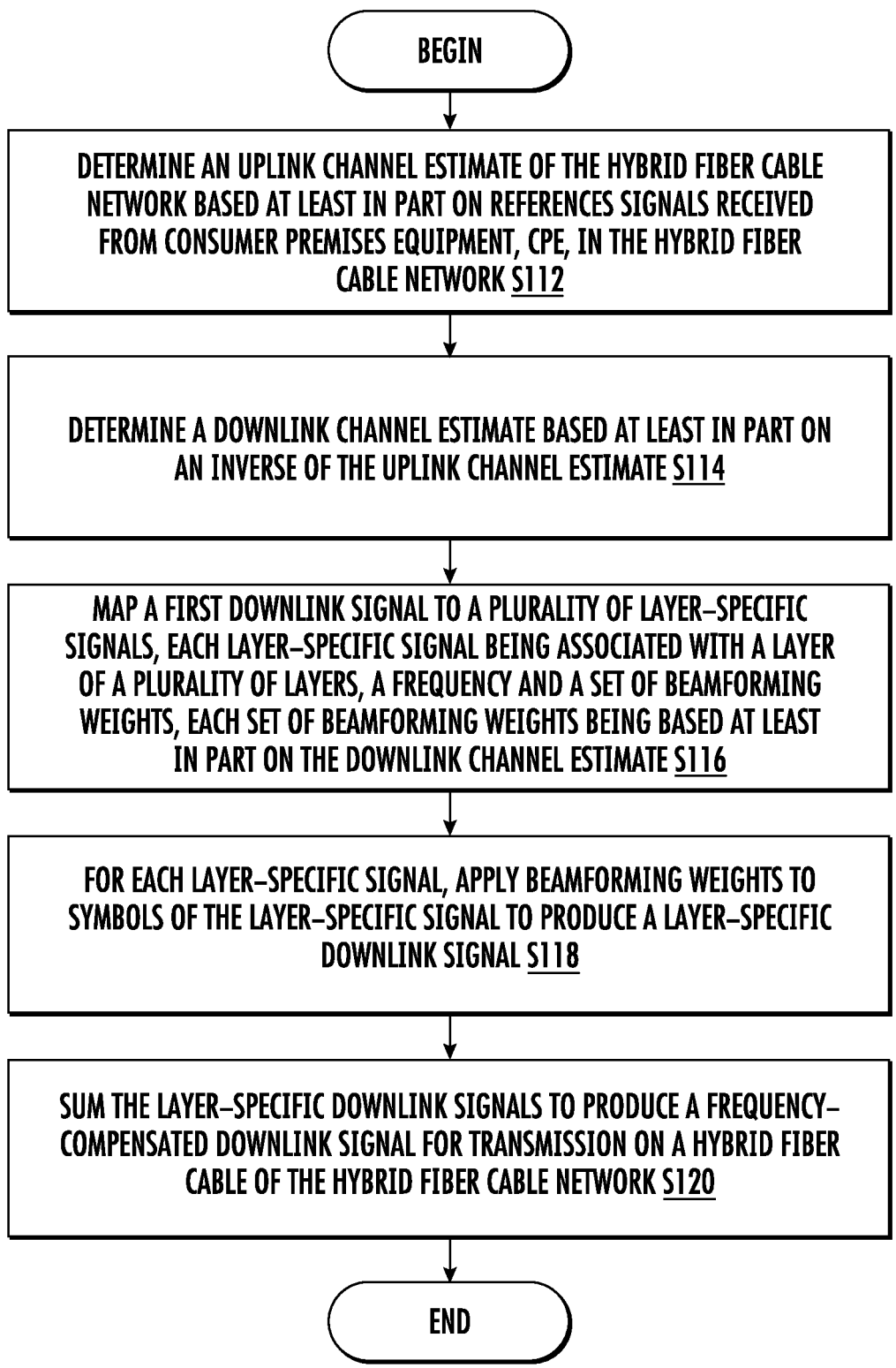
FIG. 19 is a flowchart of another example process in a network node for equalizing impairments in a coaxial cable plant.

FIG. 19 is a flowchart of another example process in a network node 34 for equalizing uplink and downlink impairments over a cable to the CPE. The process may be performed by processing circuitry 58 and/or processor 60 and/or radio interface 52 and/or communication interface 50. The process includes determining an uplink channel estimate of the hybrid fiber cable network based at least in part on references signals received from consumer premises equipment, CPE, in the hybrid fiber cable network (Block S112). The process also includes determining a downlink channel estimated based at least in part on an inverse of the uplink channel estimate (Block S114). The process also includes mapping a first downlink signal to a plurality of layer-specific signals, each layer-specific signal being associated with a layer of a plurality of layers, a frequency and a set of beamforming weights, each set of beamforming weights being based at least in part on the downlink channel estimate (Block S116). The process further includes for each layer-specific signal, applying beamforming weights to symbols of the layer-specific signal to produce a layer-specific downlink signal (Block S118). The process also includes summing the layer-specific downlink signals to produce a frequency-compensated downlink signal for transmission on a hybrid fiber cable of the hybrid fiber cable network (Block S120).

In some embodiments, the downlink channel estimate is further based on power constraints. In some embodiments, the reference signals comprise a reference signal for each layer of the plurality of layers. In some embodiments, a reference signal includes at least one of a demodulation reference signal, DMRS, a sounding reference signal, SRS, a tracking reference signal, TRS, channel state information reference signal, CSI-RS, and a phase tracking reference signal, PTRS. In some embodiments, symbols of a layer-specific signal are orthogonal frequency division multiplexed, OFDM. In some embodiments, the process also includes applying intermodulation product cancellation in each layer of the plurality of layers. In some embodiments, the process also includes applying an inverse fast Fourier transform, IFFT, to the beamforming-weighted symbols in each layer of the plurality of layers. In some embodiments, the frequency-compensated downlink signal is compensated to counteract an effect of the frequency response of the hybrid fiber cable network. In some embodiments, the reference signals are orthogonal. In some embodiments, the method also includes the reference signals are received with a slot periodicity that is lower than a slot-periodicity of slots carrying the symbols. In some embodiments, the reference signals have a slot periodicity that is scalable based on a number CPEs in the hybrid fiber cable network.

Thus, as an example, the CPE 10 can be configured to send a 3GPP SRS in the uplink. The network node 34 knows the signal sequence used by the CPE 10 and may perform a channel estimate H(f) in the frequency domain by dividing the received signal with the known signal for each subcarrier where SRS is present. If desired, this channel estimate can be averaged. The uplink PSD is calculated as $|H(f)|^2$. Further, a beam weight on a layer can be determined as an inverse of the channel estimate at the frequency corresponding to the layer by calculating $W(f)=1/H(f)=H^*(f)/|H(f)|^2$ for each subcarrier, or $1/|H(f)|$ if no phase information is needed. Here, '*' means complex conjugate. Computing a beam weight this way is known as zero forcing. It is not suitable if H(f) has very deep dips, since it can amplify noise and create electromagnetic compatibility (EMC) problems if the PSD on the HFC cable becomes too high. In that case one can use e.g. $W(f)=H^*(f)/[|H(f)|^2+Q]$ where Q controls the maximum amount of downlink compensation. This formulation is similar to a Wiener filter, where Q would be a noise-to-signal power ratio. Some common scaling for all subcarriers can be applied to the inverse to control the output power.

According to one aspect, a network node 34 is configured to communicate with a customer premises equipment (CPE) 10. The network node 34 includes a radio interface 52 and/or processing circuitry 58 configured to equalize uplink and downlink impairments by applying sector beam weights to a signal to be transmitted over a cable to the CPE 10, and transmit the signal over the cable to the CPE 10.

According to this aspect, in some embodiments, the network node 34, radio interface 52 and/or processing circuitry 58 is further configured to process reference signals to estimate the uplink and downlink impairments, the reference signals being Long Term Evolution (LTE) reference signals and/or New Radio (NR) reference signals. In some embodiments, the network node 34, processing circuitry 58 and/or radio interface 52 are configured to configure the CPE 10 to synchronize uplink and downlink reference symbol transmissions. In some embodiments, the network node 34, processing circuitry 58 and/or radio interface 52 are configured to configure the CPE 10 to align CPE timing with timing of the network node 34. In some embodiments, the network node 34, processing circuitry 58 and/or radio interface 52 are configured to configure to assign the CPE 10 to a sector. In some embodiments, the network node 34, processing circuitry 58 and/or radio interface 52 are configured to determine a signal to interference plus noise ratio (SINR) of an uplink signal from the CPE 10 to enable uplink frequency selective scheduling. In some embodiments, the sector beam weights are selected to configure a downlink power spectral density as an inverse of an uplink cable frequency response based on uplink reference signals.

According to another aspect, a method implemented in a network node 34 in communication with a customer premises equipment (CPE) 10 is provided. The method includes equalizing uplink and downlink impairments by applying sector beam weights to a signal to be transmitted over a cable to the CPE 10, and transmitting the signal over the cable to the CPE 10.

According to this aspect, in some embodiments, the method also includes processing reference signals to estimate the uplink and downlink impairments, the reference signals being Long Term Evolution (LTE) reference signals and/or New Radio (NR) reference signals. In some embodiments, the method also includes configuring the CPE 10 to synchronize uplink and downlink reference symbol transmissions. In some embodiments, the method also includes configuring the CPE 10 to align CPE timing with timing of the network node 34. In some embodiments, the method also includes assigning the CPE 10 to a sector. In some embodiments, the method also includes determining a signal to interference plus noise ratio (SINR) of an uplink signal from the CPE 10 to enable uplink frequency selective scheduling. In some embodiments, selecting the sector beam weights to configure a downlink power spectral density as an inverse of an uplink cable frequency response based on uplink reference signals.

According to yet another aspect, a customer premises equipment (CPE) 10 configured to communicate with a network node 34 is provided. The CPE 10 includes a radio interface 90 and/or a communication interface 88 configured to equalize signals received from a plurality of wireless devices (WDs) 48, generate reference signals based on the signals received from the WDs 48 and transmit the generated reference signals to the network node 34.

According to this aspect, in some embodiments, the reference signals are Long Term Evolution (LTE) reference signals and/or New Radio (NR) reference signals. In some embodiments, the CPE 10, radio interface 90 and/or a communication interface 88 are configured to demultiplex orthogonal frequency division multiplexed signals.

According to another aspect, a method implemented in a CPE 10 in communication with a network node 34 is provided. The method includes equalizing signals received from a plurality of wireless devices (WDs) 48, generating reference signals based on the signals received from the WDs 48 and transmitting the generated reference signals to the network node 34.

According to this aspect, in some embodiments, the reference signals are Long Term Evolution (LTE) reference signals and/or New Radio (NR) reference signals. In some embodiments, the method further includes demultiplexing orthogonal frequency division multiplexed signals.

According to yet another aspect, a network node 34 is configured to communicate with a plurality of customer premises equipment (CPE) 10. The network node 34 includes a radio interface 52 and/or processing circuitry 58 configured to equalize uplink and downlink impairments by calculating a set of sector beam weights for a signal to be transmitted over a cable to the CPE 10, the sector beam weights being constrained by a set of at least one product defined operational limit.

According to this aspect, in some embodiments, the network node 34, radio interface 52 and/or processing circuitry 58 are configured to: compare configured sector beam weights for a plurality of CPEs 10 to at least one customer defined operation limit of a hybrid fiber cable (HFC) network; and indicate an alarm when the calculated sector beam weights approach at least one product defined operational limit. In some embodiments, the alarm indications are included in HFC network branch information related to the plurality of CPEs 10. In some embodiments, the alarm indications are correlated against common branch paths to locate HFC network anomalies.

According to another aspect, a method in a network node 34 configured to communicate with a plurality of customer premises equipment (CPE) 10 is provided. The method includes equalizing uplink and downlink impairments by calculating a set of sector beam weights for a signal to be transmitted over a cable to the CPE 10, the sector beam weights being constrained by a set of at least one product defined operational limit.

According to this aspect, in some embodiments, the method further includes comparing configured sector beam weights for a plurality of CPEs 10 to at least one customer defined operation limit of a hybrid fiber cable (HFC) network, and indicating an alarm when the calculated sector beam weights approach at least one product defined operational limit. In some embodiments, the alarm indications are included in HFC network branch information related to the plurality of CPEs 10. In some embodiments, the alarm indications are correlated against common branch paths to locate HFC network anomalies.

Some embodiments may include one or more of the following:

Embodiment A1. A network node configured to communicate with a consumer premises equipment (CPE), the network node configured to, and/or comprising a radio interface and/or comprising processing circuitry configured to:
- equalize uplink and downlink impairments by applying sector beam weights to a signal to be transmitted over a cable to the CPE; and
- transmit the signal over the cable to the CPE.

Embodiment A2. The network node of Embodiment A1, wherein the network node, radio interface and/or processing circuitry is further configured to process reference signals to estimate the uplink and downlink impairments, the reference signals being Long Term Evolution (LTE) reference signals and/or New Radio (NR) reference signals.

Embodiment A3. The network node of Embodiment A1, wherein the network node, processing circuitry and/or radio interface are configured to configure the CPE to synchronize uplink and downlink reference symbol transmissions.

Embodiment A4. The network node of Embodiment A1, wherein the network node, processing circuitry and/or radio interface are configured to configure the CPE to align CPE timing with timing of the network node.

Embodiment A5. The network node of Embodiment A1, wherein the network node, processing circuitry and/or radio interface are configured to configure to assign the CPE to a sector.

Embodiment A6. The network node of Embodiment A1, wherein the network node, processing circuitry and/or radio interface are configured to determine a signal to interference plus noise ratio (SINR) of an uplink signal from the CPE to enable uplink frequency selective scheduling.

Embodiment A7. The network node of Embodiment A1, wherein the sector beam weights are selected to configure a downlink power spectral density as an inverse of an uplink cable frequency response based on uplink reference signals.

Embodiment B1. A method implemented in a network node in communication with a customer premise equipment (CPE), the method comprising:
- equalizing uplink and downlink impairments by applying sector beam weights to a signal to be transmitted over a cable to the CPE; and
- transmitting the signal over the cable to the CPE.

Embodiment B2. The method of Embodiment B1, further comprising processing reference signals to estimate the uplink and downlink impairments, the reference signals being Long Term Evolution (LTE) reference signals and/or New Radio (NR) reference signals.

Embodiment B3. The method of Embodiment B1, further comprising configuring the CPE to synchronize uplink and downlink reference symbol transmissions.

Embodiment B4. The method of Embodiment B1, further comprising configuring the CPE to align CPE timing with timing of the network node.

Embodiment B5. The method of Embodiment B1, further comprising assigning the CPE to a sector.

Embodiment B6. The method of Embodiment B1, further comprising determining a signal to interference plus noise ratio (SINR) of an uplink signal from the CPE to enable uplink frequency selective scheduling.

Embodiment B7. The method of Embodiment B1, further comprising selecting the sector beam weights to configure a downlink power spectral density as an inverse of an uplink cable frequency response based on uplink reference signals.

Embodiment C1. A consumer premises equipment (CPE) configured to communicate with a network node, the CPE configured to, and/or comprising a radio interface and/or a communication interface configured to:
- equalize signals received from a plurality of wireless devices (WDs);
- generate reference signals based on the signals received from the WDs; and
- transmit the generated reference signals to the network node.

Embodiment C2. The CPE of Embodiment C1, wherein the reference signals are Long Term Evolution (LTE) reference signals and/or New Radio (NR) reference signals.

Embodiment C3. The CPE of Embodiment C1, wherein the CPE, radio interface and/or a communication interface are configured to demultiplex orthogonal frequency division multiplexed signals.

Embodiment D1. A method implemented in a customer premises equipment (CPE), the method comprising:
- equalizing signals received from a plurality of wireless devices (WDs);
- generating reference signals based on the signals received from the WDs; and
- transmitting the generated reference signals to the network node.

Embodiment D2. The method of Embodiment D1, wherein the reference signals are Long Term Evolution (LTE) reference signals and/or New Radio (NR) reference signals.

Embodiment D3. The method of Embodiment D1, further comprising demultiplexing orthogonal frequency division multiplexed signals.

Embodiment E1. A network node configured to communicate with a plurality of consumer premises equipment (CPE), the network node configured to, and/or comprising a radio interface and/or comprising processing circuitry configured to:
- equalize uplink and downlink impairments by calculating a set of sector beam weights for a signal to be transmitted over a cable to the CPE, the sector beam weights being constrained by a set of at least one product defined operational limit.

Embodiment E2. The network node of Embodiment E1, wherein the network node, radio interface and/or processing circuitry are configured to:
- compare configured sector beam weights for a plurality of CPEs to at least one customer defined operation limit of a hybrid fiber cable (HFC) network; and
- indicate an alarm when the calculated sector beam weights approach at least one product defined operational limit.

Embodiment E3. The network node of Embodiment E2, wherein the alarm indications are included in HFC network branch information related to the plurality of CPEs.

Embodiment E4. The network node of Embodiment E3, wherein the alarm indications are correlated against common branch paths to locate HFC network anomalies.

Embodiment F1. A method in a network node configured to communicate with a plurality of consumer premises equipment (CPE), the method comprising:
- equalizing uplink and downlink impairments by calculating a set of sector beam weights for a signal to be transmitted over a cable to the CPE, the sector beam weights being constrained by a set of at least one product defined operational limit.

Embodiment F2. The method of Embodiment F1, further comprising:

comparing configured sector beam weights for a plurality of CPEs to at least one customer defined operation limit of a hybrid fiber cable (HFC) network; and indicating an alarm when the calculated sector beam weights approach at least one product defined operational limit.

Embodiment F3. The method of Embodiment F2, wherein the alarm indications are included in HFC network branch information related to the plurality of CPEs.

Embodiment F4. The method of Embodiment F3, wherein the alarm indications are correlated against common branch paths to locate HFC network anomalies.

Some abbreviation that are used herein are defined as follows:

| Abbreviation | Explanation |
| --- | --- |
| 3GPP | Third Generation Partnership Project |
| 4G | Fourth Generation (LTE) Radio |
| 5G | Fifth Generation (NR) Radio |
| AAS | Advanced Antenna System |
| BF | Beamforming |
| BI | Beam Index |
| DL | Downlink |
| DU | Digital Unit |
| ED | Energy Detect |
| ED Threshold | Energy Detect Threshold (as a non-limiting example, a value between −62 dBm to −72 dBm) |
| eNB | Enhanced Node B |
| KPI | Key Performance Index |
| LAA | Licensed Assisted Access |
| LTE | Long Term Evolution (4th Generation Cellular) |
| LBT | Listen Before Talk |
| LTE | Long Term Evolution |
| NR | Next Generation Radio |
| RSRP | Reference Signal Received Power |
| RSSI | Received Signal Strength Indication |
| STA | Station set (a Wi-Fi radio transceiver) |
| TDD | Time Division Duplexing |
| UE | User Equipment, such as a cell phone |
| UL | Uplink |

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method performed at a network node to compensate for a frequency response of a hybrid fiber cable network served by the network node, the method comprising:
    determining an uplink channel estimate of the hybrid fiber cable network based at least in part on references signals received from consumer premises equipment, CPE, in the hybrid fiber cable network;
    determining a downlink channel estimated based at least in part on an inverse of the uplink channel estimate;
    mapping a first downlink signal to a plurality of layer-specific signals, each layer-specific signal being associated with a layer of a plurality of layers, a frequency and a set of beamforming weights, each set of beamforming weights being based at least in part on the downlink channel estimate;
    for each layer-specific signal, applying beamforming weights to symbols of the layer-specific signal to produce a layer-specific downlink signal; and
    summing the layer-specific downlink signals to produce a frequency-compensated downlink signal for transmission on a hybrid fiber cable of the hybrid fiber cable network.

2. The method of claim 1, wherein the downlink channel estimate is further based on power constraints.

3. The method of claim 1, wherein the reference signals comprise a reference signal for each layer of the plurality of layers.

4. The method of claim 1, wherein a reference signal includes at least one of a demodulation reference signal, DMRS, a sounding reference signal, SRS, a tracking reference signal, TRS, channel state information reference signal, CSI-RS, and a phase tracking reference signal, PTRS.

5. The method of claim 1, wherein symbols of a layer-specific signal are orthogonal frequency division multiplexed, OFDM.

6. The method of claim 1, further comprising applying intermodulation product cancellation in each layer of the plurality of layers.

7. The method of claim 1, further comprising applying an inverse fast Fourier transform, IFFT, to the beamforming-weighted symbols in each layer of the plurality of layers.

8. The method of claim 1, wherein the frequency-compensated downlink signal is compensated to counteract an effect of the frequency response of the hybrid fiber cable network.

9. The method of claim 1, wherein the reference signals are orthogonal.

10. The method of claim 1, further comprising storing successive beamforming weights for subsequent analysis.

11. The method of claim 1, wherein the reference signals are received with a slot periodicity that is lower than a slot-periodicity of slots carrying the symbols.

12. The method of claim 1, wherein the reference signals have a slot periodicity that is scalable based on a number CPEs in the hybrid fiber cable network.

13. A network node configured to compensate for a frequency response of a hybrid fiber cable network served by the network node, the network node comprising:
    processing circuitry configured to:
        determine an uplink channel estimate of the hybrid fiber cable network based at least in part on references signals received from consumer premises equipment, CPE, in the hybrid fiber cable network;
        determine a downlink channel estimate based at least in part on an inverse of the uplink channel estimate;
        map a first downlink signal to a plurality of layer-specific signals, each layer-specific signal being associated with a layer of a plurality of layers, a frequency and a set of beamforming weights, each set of beamforming weights being based at least in part on the downlink channel estimate;
        for each layer-specific signal, apply beamforming weights to symbols of the layer-specific signal to produce a layer-specific downlink signal; and
        sum the layer-specific downlink signals to produce a frequency-compensated downlink signal for transmission on a hybrid fiber cable of the hybrid fiber cable network.

14. The network node of claim 13, wherein the downlink channel estimate is further based on power constraints.

15. The network node of claim 13, wherein the reference signals comprise a reference signal for each layer of the plurality of layers.

16. The network node of claim 13, wherein a reference signal includes at least one of a demodulation reference signal, DMRS, a sounding reference signal, SRS, a tracking reference signal, TRS, channel state information reference signal, CSI-RS, and a phase tracking reference signal, PTRS.

17. The network node of claim 13, wherein symbols of a layer-specific signal are orthogonal frequency division multiplexed, OFDM.

18. The network node of claim 13, wherein the processing circuitry is further configured to apply intermodulation product cancellation in each layer of the plurality of layers.

19. The network node of claim 13, wherein the processing circuitry is further configured to apply an inverse fast Fourier transform, IFFT, to the beamforming-weighted symbols in each layer of the plurality of layers.

20. The network node of claim 13, wherein the frequency-compensated downlink signal is compensated to counteract an effect of the frequency response of the hybrid fiber cable network.

21. The network node of claim 13, wherein the reference signals are orthogonal.

22. The network node of claim 13, wherein the processing circuitry further includes memory configured to store successive beamforming weights for subsequent analysis.

23. The network node of claim 13, wherein the reference signals are received with a slot periodicity that is lower than a slot-periodicity of slots carrying the symbols.

24. The network node of claim 13, wherein the reference signals have a slot periodicity that is scalable based on a number CPEs in the hybrid fiber cable network.

* * * * *